US012365115B2

(12) United States Patent
Pfister et al.

(10) Patent No.: US 12,365,115 B2
(45) Date of Patent: Jul. 22, 2025

(54) METHOD FOR PRODUCING A POWDER COMPRISING AT LEAST ONE POLYMER AND SUCH A TYPE OF POWDER

(71) Applicant: EOS GmbH Electro Optical Systems, Krailling (DE)

(72) Inventors: Andreas Pfister, Fuerth (DE); Mandy Gersch, Ulm (DE); Daniel Froehlich, Graefelfing (DE); Verena Galitz, Krailling (DE); Sybille Fischer, Eichenau (DE)

(73) Assignee: EOS GmbH Electro Optical Systems, Krailling (DE)

( * ) Notice: Subject to any disclaimer, the term of this patent is extended or adjusted under 35 U.S.C. 154(b) by 279 days.

(21) Appl. No.: 17/049,511

(22) PCT Filed: Apr. 23, 2019

(86) PCT No.: PCT/EP2019/060398
§ 371 (c)(1),
(2) Date: Oct. 21, 2020

(87) PCT Pub. No.: WO2019/206921
PCT Pub. Date: Oct. 31, 2019

(65) Prior Publication Data

US 2021/0129383 A1 May 6, 2021

(30) Foreign Application Priority Data

Apr. 23, 2018 (DE) ......................... 102018206236.6

(51) Int. Cl.
*B29B 9/16* (2006.01)
*B29B 7/06* (2006.01)
(Continued)

(52) U.S. Cl.
CPC .................. *B29B 7/06* (2013.01); *B29B 7/18* (2013.01); *B29B 7/286* (2013.01); *B29B 7/823* (2013.01);
(Continued)

(58) Field of Classification Search
None
See application file for complete search history.

(56) References Cited

U.S. PATENT DOCUMENTS 3,331,825 A 7/1967 Tominaga et al.
5,730,925 A 3/1998 Mattes et al.
(Continued)

FOREIGN PATENT DOCUMENTS

CA 2530762 A1 * 6/2006
DE 19514740 4/1996
(Continued)

OTHER PUBLICATIONS 3-page article for Polyvinyl Chloride by Wikipedia, Downloaded on Mar. 20, 2024.*
(Continued)

*Primary Examiner* — Tae H Yoon
(74) *Attorney, Agent, or Firm* — Polsinelli PC

(57) ABSTRACT

A method for producing a powder comprising at least one polymer for use in a method for the additive manufacture of a three-dimensional object is described. The method includes the step of mechanically treating the powder in a mixer with at least one rotating mixing blade, wherein the powder is exposed to a temperature $T_B$ and $T_B$ is at least 30° C. and is below the melting point $T_m$ of the polymer (determined according to DIN EN ISO 11357) if the polymer is a semi-crystalline polymer, or wherein $T_B$ is at least 30° C. and wherein $T_B$ is at most 50° C. above the glass transition temperature $T_g$ of the polymer (determined
(Continued)

according to DIN EN ISO 11357) if the polymer is a melt-amorphous polymer. Compared to a time before the start of the treatment, it may be achieved that after the treatment, the bulk density of the powder is increased by at least 10% (or in the case of polymer, copolymer or polymer blend of polyamide at least 2% and more) and the BET surface area is decreased by at least 10%, and optionally also the pourability is improved by at least 10%.

16 Claims, 7 Drawing Sheets

(51) Int. Cl.

| | |
|---|---|
| ***B29B 7/18*** | (2006.01) |
| ***B29B 7/28*** | (2006.01) |
| ***B29B 7/82*** | (2006.01) |
| ***B33Y 70/00*** | (2020.01) |
| *B29K 23/00* | (2006.01) |
| *B29K 71/00* | (2006.01) |
| *B29K 77/00* | (2006.01) |

(52) U.S. Cl.

CPC ................ *B29B 7/826* (2013.01); *B29B 9/16* (2013.01); *B33Y 70/00* (2014.12); *B29K 2023/12* (2013.01); *B29K 2071/00* (2013.01); *B29K 2077/00* (2013.01)

(56) References Cited

U.S. PATENT DOCUMENTS

| | | | | |
|---|---|---|---|---|
| 6,264,861 | B1 | 7/2001 | Tavernier et al. | |
| 2006/0071359 | A1 | 4/2006 | Monsheimer et al. | |
| 2006/0189784 | A1 | 8/2006 | Monsheimer et al. | |
| 2006/0246287 | A1 | 11/2006 | Gersch et al. | |
| 2012/0114848 | A1 * | 5/2012 | Muller | C08J 3/14 524/592 |
| 2013/0274435 | A1 | 10/2013 | Diekmann et al. | |
| 2017/0312938 | A1 | 11/2017 | Brule et al. | |

FOREIGN PATENT DOCUMENTS

| | | |
|---|---|---|
| DE | 102004047876 | 4/2006 |
| DE | 102005008044 | 8/2006 |
| DE | 102007016656 | 10/2008 |
| DE | 102012205908 | 10/2013 |
| EP | 2123430 | 11/2009 |
| JP | 3819701 B2 * | 9/2006 |
| WO | 2004050746 | 6/2004 |
| WO | WO 2005/010087 A1 * | 2/2005 |
| WO | 2008122426 | 10/2008 |
| WO | WO 2008122426 A2 * | 10/2008 |

OTHER PUBLICATIONS

DIN EN ISO 75 (Teile 1-3), Aug. 2013, 49 pages.
ISO 75 Preview iso.org (Part 1-3), 2004, 8 pages.
DIN EN ISO 11357, Feb. 2017, 42 pages.
ISO 11357 Preview iso.org, 2016, 8 pages.
ISO 13320, Oct. 1, 2009, 59 pages.
ISO 13322-2, Nov. 1, 2006, 31 pages.
ISO 6186—Preview iso.org, 1998, 1 page.
DIN ISO 9277, Jan. 2014, 30 pages.
ISO 9277 Preview iso.org, 2011, 4 pages.
DIN EN ISO 1133-1, 2012, 33 pages.
ISO 1133-1 Preview iso.org, 2011, 4 pages.
DIN 53492, Nov. 1992, 3 pages.
Dr. Carsten Pretorius, "From Powder to Beads," Pharma and Food Journal; Jan. 2000, 5 pages.
Andreas Pfister, "New Material Systems for Three-Dimensional Printing and Selective Laser Sintering," PhD Thesis; 2005, 5 pages.
Third Party Observations for EP Application No. 19719832.8; Jul. 19, 2021, 5 pages.

* cited by examiner

METHOD FOR PRODUCING A POWDER COMPRISING AT LEAST ONE POLYMER AND SUCH A TYPE OF POWDER

TECHNICAL FIELD OF THE INVENTION

The present invention relates to methods for producing a powder comprising at least one polymer for use in a method for the additive manufacture of a three-dimensional object as well as to a corresponding powder.

BACKGROUND OF THE INVENTION

Methods for the additive manufacture of a three-dimensional object by selective layer-by-layer solidification of a material in powder form are used for example in rapid prototyping, rapid tooling, and additive manufacturing. An example of such a method is known as "selective laser sintering" or "selective laser melting". Herein, a thin layer of a material in powder form (so-called "building material") is repeatedly applied within a build area and the powder material is selectively solidified in each layer by selectively irradiating it with a laser beam. This means that pulverulent material is melted partially or completely at these positions and solidifies to form a joint material. In this way, a three-dimensional object results. A material in powder form that comprises a polymer may be used for this purpose.

For example document DE 195 14 740 C1 describes a method for manufacturing a three-dimensional object by selective laser sintering and a device for carrying out this method.

Document EP 2 123 430 A1 describes a method for manufacturing a three-dimensional object by selective sintering of a powder using electromagnetic radiation such as for example laser radiation. The powder comprises a polymer or copolymer from the class of polyaryletherketones (PAEK).

A challenge in the manufacture of three-dimensional objects using one of the known methods of selective layer-by-layer solidification of a pulverulent material is to manufacture the three-dimensional objects with sufficient precision, i.e. with high dimensional accuracy. A further challenge is to equip the three-dimensional objects manufactured in this way with the desired material properties.

In particular, it is typically desired to manufacture three-dimensional objects with the lowest possible porosity since the mechanical properties of three-dimensional objects (tensile strength, E-modulus, elongation at break, toughness, impact strength, etc.) are usually all the more advantageous the lower the porosity of the three-dimensional object.

Many powders, after they have been produced by a polymerisation reaction and possibly a subsequent size reduction, have properties that lead to three-dimensional objects with high porosity and often unfavourable mechanical properties, if the three-dimensional object is produced, for example, by selective laser sintering or selective laser melting. In addition, in the course of selective laser sintering, these powders may often only be insufficiently dosed and applied as a powder layer. The consequence may be a process instability (insufficient dosage) and inhomogeneous application in the powder bed. Inhomogeneous application may in turn lead to an additional increase in the porosity of the three-dimensional object and thus to poor mechanical properties.

These problems occur particularly frequently if the used powder comprises a thermoplastic polymer.

Various methods are known in the prior art are available for the size reduction of a polymer material to obtain a powder, e.g. precipitation from a solvent, grinding, in particular cryogenic grinding, of a coarse powder or granulate, melt spraying, spray drying, melt dispersing, and melt spinning, wherein melt spinning comprises a fibre cutting step. In principle, a polymer may also be present as a powder after the polymerisation reaction without a separate size reduction step being necessary.

SUMMARY OF THE INVENTION

An object of the present invention is to provide an improved method for producing a powder, wherein said powder comprises at least one polymer and wherein said powder is intended for use in a method for additive manufacturing of a three-dimensional object. Herein, it is in particular preferable to provide a method which enables the production of a powder with which three-dimensional objects with improved properties, for example lower porosity, higher transparency, better dimensional stability and/or better shape fidelity, may be produced without simultaneously reducing the mechanical properties.

A further object of the present invention is to provide an appropriate powder. The objects are solved by a method, as well as a powder. Correspondingly, an additive manufacturing method for the production of a three-dimensional object is provided.

There have already been attempts to pre-treat polymer base powders before the actual procedure for manufacturing the three-dimensional object in order to influence the porosity (or BET surface) or the bulk density. For instance, WO2004/050746 A (EP1537170B) describes heating polyamide 12 powder obtained by precipitation to 140° C. in a commercial mixer within 10 minutes and then keeping it at this temperature for five minutes to reduce the BET surface area. In WO2008/122426, in Example 7, a treatment to increase bulk density is described in which PEEK powder was heated to 150° C. in a commercial mixer for 25 minutes, then kept at this temperature for 25 minutes, then further heated to 170° C. within 20 minutes and finally kept at 170° C. for 60 minutes. US 2017/0312938 A1 discloses a pre-treatment of PEKK powder with a mixer equipped with a rotor blade (30 to 120 minutes; 30 to 70 m/s rotor speed). At a rotor blade speed of 43 m/s, an increase of the tapped density of the treated PEKK powder is seen. However, the prior art documents do not show that and how both the tapped density and the BET surface may be simultaneously improved in a material-specific manner to enable improved performance for the powder in terms of a low refreshment factor, for three-dimensional objects manufactured with this material in terms of lower porosity, excellent dimensional stability and/or better shape retention, without simultaneously impairing the mechanical properties. Obviously, only through the pre-treatment method according to the invention, taking into account the critical, polymer-material-related temperature parameters disclosed here and, if applicable, further relevant treatment conditions also disclosed here, a surface fine structure never achieved so far and a surface rounding even in the microscopic surface area of the respective polymer particles is achieved and at the same time an excellent particle size distribution of the polymer powder is ensured, wherein the reduction of the bulk density and the increase of the BET surface—BET not only measured in absolute values, but above all as a relative percentage increase compared to the corresponding starting material independent of the production method of the starting material—are good indicators of the improved surface structure and rounding.

The features defined in the individual dependent claims and the features indicated in the description constitute further developments of the solution principle defined in the independent claims and further contribute to the achievement of the surprising effects and unexpected advantages described below.

Features in dependent claims and in parts of the description which refer to one of these methods are also further developments of the other method and of the powder, and vice versa.

For measuring the temperatures occurring in the course of the inventive method ($T_{max}$ and $T_{Man}$ according to the definitions given below), temperature sensors are preferably used which automatically record the temperature or transmit it to the control device. These temperature sensors are preferably arranged inside the mixer or in the casing of the mixer so that they can record the temperature of the mixture or the casing. The temperature sensors may, for example, be temperature sensors comprising thermocouples and/or measuring resistors which, in the relevant temperature range from room temperature to several hundred degrees Celsius, preferably have a measuring accuracy of 1° C., more preferably a measuring accuracy of 0.1° C. or an even higher measuring accuracy. Appropriate temperature sensors are already integrated by the manufacturer in commercially available mixers.

If in the following description and the claims, reference is made to the heat deflection temperature HDT-A or HDT-B, these are values determined according to the relevant standard DIN EN ISO 75 (parts 1 to 3).

In the context of this invention, HDT-A values and HDT-B values refer to the polymer as such. The following applies to a polymer material which is composed of a matrix consisting of a specific polymer in which additives such as reinforcing materials are embedded: The HDT-A value and the HDT-B value of the polymer material is defined as the HDT-A value and the HDT-B value, respectively, of the polymer of which the matrix is composed. This also applies if a different heat deflection temperature would actually be measured for the polymer material according to DIN EN ISO 75. PEKK-60/40, for example, has an HDT-A value of 139° C. By adding carbon fibres as reinforcing material, the heat deflection temperature increases. Nevertheless, in the context of this invention, the HDT-A value for carbon fibre reinforced PEEK-60/40 is 139° C.

It was found that for the invention, as regards the choice of the temperature of the powder which occurs during mechanical treatment in a mixer, it does in fact not, or at least not essentially, depend on whether the powder is reinforced with a fibrous material or another additive or whether the powder has been thermally pre-treated, for example by heating. Essential are the temperature characteristics (HDT-A, HDT-B, glass transition temperature $T_g$, melting point $T_m$) of the polymer itself. This suggests the theory that in the course of the method according to the invention there is a modification of the surface of the powder particles, in particular a rounding and/or smoothing. The thermal or mechanical energy required for this surface modification that is supplied according to the invention is not or only slightly dependent on whether the powder particles are reinforced in the bulk (i.e. inside the grain) or not.

PEKK-60/40 is polyether ketone ketone with a terephthalic acid/isophthalic acid isomer ratio of 60/40, i.e. the terephthalic acid mole fraction is 60%.

Accordingly, PEKK-70/30 and PEKK-80/20 are polyether ketone ketones with a terephthalic acid/isophthalic acid isomer ratio of 70/30 and 80/20 respectively.

In Table 1, HDT-A values and HDT-B values (each of which can be taken from literature or determined according to DIN EN ISO 75) are presented as examples for various polymers, some of which were used in the examples described below. The usual abbreviations for the polymers are used. Table 1 also presents values for the glass transition temperature $T_g$ (determined according to DIN EN ISO 11357) and the melting point $T_m$ (according to DIN EN ISO 11357) for these polymers. If "n.m." is given in a table field instead of a value, this means that the corresponding value has not been determined or cannot be determined.

TABLE 1

| Polymer | HDT-A value [° C.] | HDT-B value [° C.] | $T_g$ [° C.] | $T_m$ [° C.] |
|---|---|---|---|---|
| PEKK-60/40 | 139 | n.m. | 160 | n.m. |
| PEKK-60/40 reinforced with 23% carbon fibres | 139 | 274 | 160 | 300 to 305 |
| PEKK-70/30 | 172 | n.m. | 162 | 331 to 334 |
| PEKK-80/20 | 175 | 250 | 160 | 357 to 360 |
| PEEK | 152 | 205 | 143 to 164 | 343 to 372 |
| PEEK reinforced with 30% carbon fibres | 152 | 205 | 143 | 343 |
| PEK | 163 to 165 | n.m. | 152 | 373 |
| PPS | 105 to 115 | 132 | 90 to 110 | 280 |
| PP (Homopolymer) | 55 | 100 | 0 | 164 |
| PA66 | 75 | 220 | 72 | 260 |
| PA6 | 60 | 180 | 60 | 220 |
| PA12 | 45 to 50 | 110 to 125 | 37 | 178 |
| PA11 | 46 to 55 | 150 to 180 | 46 | 189 to 198 |
| POM | 95 | 156 | n.m. | 166 |
| PET | 80 | 115 | 70 | 255 |
| PE-HD | 45 | n.m. | −70 | 130 to 145 |
| PBT | 60 | 150 | 47 | 220 |
| Polyetherimide | 190 | 200 | 217 | n.m. |
| Polycarbonate | 125 | 137 | 145 | n.m. |
| PMMA | 95 | 100 | 105 | n.m. |
| PS | 68 | 80 | 100 | n.m. |
| SAN | 98 | 103 | 108 | n.m. |
| ABS | 92 | 95 | 106 | n.m. |

In the context of the invention, the glass transition temperature $T_g$ and the melting point $T_m$ of the materials used were determined by means of DSC measurements according to the standard DIN EN ISO 11357. The measurements were carried out on a DSC device of the type "Mettler Toledo DSC823e" with automatic sample changer. The evaluations were carried out using the "STARe Software" software, version 9.30. Nitrogen 5.0, i.e. nitrogen with a purity of 99.999 percent by volume, was used as purge gas. Using DSC, a sufficiently wide temperature range was examined for each material (for the PEKK material examined, for example, the range from 0° C. to 360° C.). The heating and cooling rate was 20° C./min. The melting point was determined in the first heating run. The melting point corresponds to the peak temperature.

In the context of the invention, polymers for which essentially no crystallization or no crystallization at all is observed in the DSC measurements at a cooling rate of 20° C./min are referred to as melt-amorphous polymers.

In the context of the invention, polymers are designated as pseudo-amorphous polymers which show at least one melt peak in the first heating run of DSC measurements at a heating rate of 20° C./min, determined according to DIN EN ISO 11357, but which essentially do not show crystallisation when cooled at a cooling rate of 20° C./min. The pseudo-amorphous polymers may behave like an amorphous and/or like a semi-crystalline material.

In the context of the present invention, the particle sizes and their distribution were determined by laser diffraction in accordance with the standard ISO 13320 in the case of powder comprising polyether ketone ketone (PEKK). The measurements were carried out in water with the addition of a dispersing medium (surfactant) with the CILAS 1064 instrument from Quantachrome Partikelmesstechnik with a wet dispersing cell. In the course of wet dip dispersion, the sample was additionally dispersed with ultrasound. The measurement evaluation of the particle size distribution was carried out according to the Fraunhofer model.

In the case of the remaining powders, the particle sizes and their distribution were determined by optical methods in accordance with the ISO 13322-2 standard. Herein, the sample was dispersed in a liquid medium. Herein, the liquid medium was pumped so that it flowed along in front of a calibrated optical unit. For the evaluation, 10000 single images were taken. The particle sizes and shapes were determined based on defined measurement parameters. The determined sizes are the diameters of the circles $x_{Ai}$ with an area equal to the particle projection (indicated as $d_{10}$, $d_{50}$ and $d_{90}$, i.e. as 10%-quantile, 50%-quantile and 90%-quantile of the volumetric particle size distribution) as a measure for the particle sizes. In the context of this invention, details of the quantiles and values calculated therefrom refer to the method mentioned. The fraction of ultra-fine particles (particles with $x_{Ai}$<10 μm) was also determined. This volume fraction is referred to in the following as "ultra-fine powder fraction".

From the quantiles determined as described above, the distribution width VB of the particle size distribution can be calculated according to the following formula:

$$VB=(d_{90}-d_{10})/d_{50}$$

To carry out the optical methods, distilled water is placed in a receiver tank in the measuring device of the Camsizer XT type (Retsch Technology, software version 6.0.3.1008) with the X-Flow module and degassed. The surface density of measured particles/air bubbles is below 0.01. A sample quantity of approximately 1 to 3 mg of the powder material to be analysed is dispersed in 2 to 3 mL of a solution of Triton X in water. The concentration of Triton X in the solution is 3 mass percent. The dispersed sample is slowly dropwise added to the distilled water in the receiver tank until a measured surface density of 0.4 to 0.6 is present. The measurement is started and repeated several times to obtain a statistical measurement value.

The rotation speed of the mixer is given as the speed of the ends of a mixing blade which are furthest away from the drive shaft of the mixer. This speed of rotation of the mixer is also called "speed of the mixer" or "speed of the mixing blade" or "speed of the mixing blades" in the context of the present invention.

Specifying the speed, for example in the unit m/s, may be a measure of the mixing speed and thus of the energy introduced into the material to be mixed (powder) by the mixing process independently of the size of the mixer.

The pourability was determined according to the ISO 6186 standard using a 25 millimetre nozzle as test funnel.

The BET surface was determined according to DIN ISO 9277 by adsorption of nitrogen. The measurements were carried out on a measuring device of the company Quantachrome, Nova Station A with the software Quantachrome Instruments v11.0. Before the measurement, the samples were degassed at 80° C. under vacuum of about 100 mbar for 2 hours. The evaluation was carried out using the 5-point method.

It is expedient that the first mentioned condition applies to mixers with relatively large volumes (e.g. more than 40 litres volume), while the second mentioned condition applies to mixers with relatively small volumes (e.g. up to 40 litres volume); in this way the appropriate energy input is adjusted.

During the holding phase, the maximum speed of the mixing blade may be at least 20 and/or at most 100 m/s, preferably at least 30 and/or at most 70 m/s, particularly at least 35 and/or at most 50 m/s. If the treatment temperature is below 100° C., the maximum speed of the mixing blade during the holding phase should be in the range 5 to 15 m/s, preferably in the range 8 to 12 m/s.

The treatment with the rotating mixer according to the invention preferably includes only the heating phase/heating time and the holding phase/holding time, and no further heating phase/heating time by the rotating mixer. However, optionally, for example when using PAEK powder, a further pure heating step may be added without or with very little circulation.

Preferably, the starting powder which is subjected to the actual mechanical treatment according to the invention is free of flow aids because the presence of flow aid during the actual thermomechanical treatment may lead to a reduction of the bulk density.

By the invention, it is possible, in a manner not conventionally considered or expected, to provide a powder which is designated for the additive manufacture of a three-dimensional object and with which preferably improved mechanical properties of the manufactured three-dimensional object may be achieved.

Furthermore, it is surprisingly possible to process the provided powder with a lower refreshment factor in the manufacture of the three-dimensional object. This means that when reusing powder that has already been used in the additive manufacturing process (so-called "old powder"), less powder that has not yet been used in the additive manufacturing process (so-called "new powder") must be added.

Furthermore, it is preferably possible to process the provided powder in the process in an enlarged process window. This means that the difference between the upper and lower building temperature in the additive process is increased.

In the course of the method according to the invention, the mechanical energy of the rotation of the mixing blades of a mixer is converted into thermal energy so that the powder, which is the mixing material in the mixer, heats up. At the same time, the powder is subjected to mechanical action by the mixing blades, particularly shearing. Through the combined thermal and mechanical treatment (also known as "thermomechanical treatment" for short), improvements in the powder properties may be achieved, such as an increase in the bulk density, a reduction in the BET surface area, an improvement in the applicability in the form of powder layers, an increase in the sphericity and reduction in the roughness of the powder particles, etc.

Preferably, thermomechanical treatment may also reduce the fraction of ultra-fine particles (<10 μm), i.e. the ultra-fine powder content. The ultra-fine particles are often disturbing during laser sintering, as they impair the process stability.

Electrostatic charging in particular may lead to a deterioration of the pourability and thus the application of the powder. The higher the fraction of ultra-fine particles in a powder, the greater the tendency for electrostatic charging. The ultra-fine particles may be pressed into the larger powder particles by mechanical energy at a suitable temperature, which may lead to a reduction in the BET surface area in addition to a reduction in the ultra-fine powder content.

It has been found that powdered material with a high bulk density may be used to produce three-dimensional objects which have a lower porosity and therefore better mechanical properties than three-dimensional objects made from powder with a lower bulk density.

Since additive manufacturing, in contrast to injection moulding and similar techniques, is a process without powder compression by pressure, the bulk density is of central importance in additive manufacturing. In other words, the powder grains must flow well into each other without the application of pressure in order to keep the porosity low.

If the powders have an unfavourable powder form after the polymerisation reaction and size reduction, they typically also have poor pourability and may only be insufficiently dosed or applied. An unfavourable powder form must in particular be assumed if the powder particles are rather fibrous instead of spherical or potato-shaped.

According to the invention, the powders may also have an improved pourability. This improves the layer application and the dosage of the powder, so that process instabilities occur less frequently or may be completely avoided.

According to the invention, the powder may also have a particularly low BET surface area, which further leads to improved processability of the powder and a further improvement in the mechanical properties of the three-dimensional objects produced therewith.

Furthermore, it was observed by means of X-ray diffractometry that the treatment by the method according to the invention may result in a crystallinity in the area of the surface of the powder particles which is changed compared to untreated powder.

This shows that the surface of the powder particles may be modified by the procedure according to the invention. Within the scope of the invention, it is possible to add to the mechanical treatment according to the invention a further treatment step, wherein further modifications of the surface are possible. All in all, a combined surface modification may be made possible in this way.

By means of microscopic and electron-microscopic methods, it could be determined that the method according to the invention may lead to a smoothing of the powder particles. Powders with smoother powder particles generally have higher bulk densities than powders with comparatively rough powder particles.

Within the scope of the method according to the invention, due to the rapid heating of the powder with simultaneous shear stress on the powder particles, it may be avoided that the powder has to be heated to temperatures which are so high that damage to the powder may occur. Such high temperatures may have an unfavourable effect, for example, by changing the melt viscosity and other properties of the powder due to an increase in molar mass, degradation or cross-linking. This in turn may lead to a situation where there is no negative change in the mechanical properties and/or the refreshment factor of the powder and/or the process window of the powder during processing in the additive manufacturing process.

By heating the powder particles rapidly according to the invention, it may be achieved that the powder particles in the core area are heated much less than in their outer area. Powder particles with a less strongly heated core have a higher dimensional stability against the shear stress caused by mixing than powder particles which are similarly strongly heated in the core area as in the peripheral area. Slow heating of the powder results in the core of the powder particles being heated more than is the case with rapid heating. Rapid heating smoothes the outer areas of the powder particles in particular, without occurence of deformation of the powder particles.

Furthermore, the rapid heating and the treatment at a relatively low temperature according to the invention may prevent that the melt viscosity of the polymer is excessively increased. This advantageous effect is particularly strong in the case of polyaryletherketones and polyphenylene sulfide. In the case of polymers produced by polycondesation reactions under water elimination, such as polyamides and polyesters, depending on the end group ratio and stabilisation, an increase or decrease the melt viscosity may occur upon treatment at high temperatures and for a long period of time due to post-condensation, degradation reactions due to insufficient stabilisation, etc. In the case of polyolefins, such as polypropylene or polyethylene, radical molar mass degradation may occur due to too high temperatures and insufficient stabilisation.

A change in melt viscosity may be determined on the basis of melt flow index measurements: The lower the melt volume flow rate (often referred to as “MVR” for the English term “Melt Volume-flow Rate”), the higher the melt viscosity.

The problems avoided by rapid heating occur particularly in the case of an exclusively thermal treatment (“tempering”) of the powder. During tempering, the powder is heated by a heater and not mechanically treated by a mixer. Indeed, the temperature to be applied for tempering is typically higher than in the case of the invention, i.e. thermomechanical treatment. Furthermore, the temperature distribution in the powder during tempering is inhomogeneous, so that there are particularly strongly overheated areas. Furthermore, during tempering, the treatment of the powder is typically carried out over a longer period of time. According to the invention, the problems associated with the exclusively thermal treatment of the powder may be reduced or even completely avoided.

Accordingly, less significant improvements in the bulk density and the BET surface area than may be achieved by the present invention occur during the exclusively thermal treatment of polymer powders.

In the case of some powders, particularly those comprising PAEK, it has been shown to be advantageous to carry out a purely thermal treatment of the powder following the thermomechanical treatment of the powder according to the invention. The purely thermal treatment may be carried out in an oven, for example.

According to the invention, significant improvements in the properties of powders comprising polyaryletherketone (PAEK), particularly powders comprising polyether ketone ketone (PEKK), may be achieved after very short treatment times of less than, for example, 30 minutes, which is a significant reduction compared to the prior art. This is a significant improvement in the economic efficiency of the method.

The inventors have recognised that in connection with the aforementioned advantages, which are possible according to the invention, it is important to apply high shear energy to the powder in the shortest possible time without overheating the powder.

Depending on the number and geometry of the mixing blades, the geometry of the container in which the powder is located during mixing, the degree of filling of the mixer, the cooling of the mixer, particularly of the mixer shell, and the initial bulk density, the speed of rotation of the mixing blades and the treatment time are selected. The speed of rotation of the mixing blades is not necessarily constant, but may be varied in the course of the method according to the invention.

According to a preferred embodiment, the speed of rotation of the mixing blades is selected in such a way that the powder reaches the desired treatment temperature within the shortest possible time without subsequently exceeding the temperature ("overheating" beyond the desired temperature), i.e. the temperature is maintained for the remaining treatment time so that it does not exceed an upper limit value and does not fall below a lower limit value.

Particularly for powders containing PAEK, it was surprisingly found that a duration of the thermomechanical treatment of less than 30 minutes (for heating and holding the temperature) may be sufficient to achieve improved or even optimised results.

The mixer preferably has at least two mixing blades, particularly preferably at least three mixing blades being preferably offset by 90° to each other. A mixing blade arrangement is particularly preferred with three mixing blades with at least two curved and one straight mixing blade. The number of mixing blades and the geometry have a decisive influence on the application of shear energy and thus on the treatment duration.

Often the speed of rotation has a value of 20-40 m/s in order to heat the powder sufficiently fast without overheating it.

The method according to the invention has proven to be particularly advantageous in the case of polymers which are harder than typical elastomers.

Preferably, the powder comprises at least one of the above mentioned polymers or polyblends.

BRIEF DESCRIPTION OF THE DRAWINGS

Further features and advantages of the invention can be found in the description of embodiments and examples with reference to the attached drawings.

DETAILED DESCRIPTION OF THE EMBODIMENTS

Figure 1:
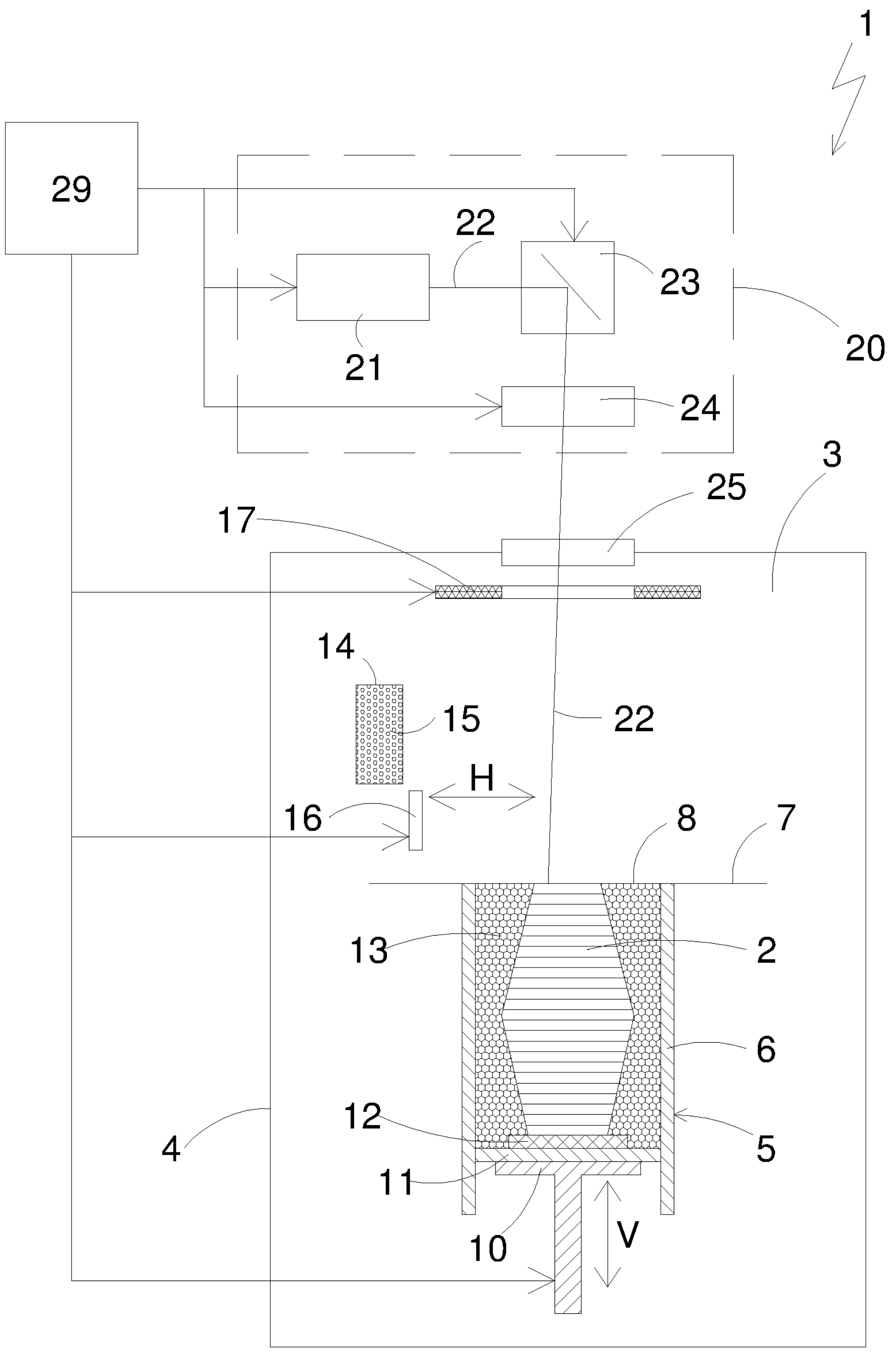
FIG. 1 shows a schematic and vertical sectional view of a device with which the method for the additive manufacture of a three-dimensional object can be carried out.

The device shown in FIG. 1 is a laser sintering or laser melting device 1 for manufacturing an object 2 from a material 15 in powder form. Powder material 15 is also referred to as "building material" in this context. With regard to the choice of the powder material, reference is made to the above description.

Device 1 comprises a process chamber 3 with a chamber wall 4. In the process chamber 3, a container 5 open at the top is arranged with a container wall 6. A working plane 7 is defined by the upper opening of the container 5, wherein the area of the working plane 7 lying within the opening, which can be used for the construction of the object 2, is called build area 8. In the container 5, there is a support 10 movable in a vertical direction V, to which a base plate 11 is attached, which closes the container 5 at the bottom and thus forms its bottom. The base plate 11 may be a plate formed separately from the support 10 and attached to the support 10, or it may be formed integrally with the support 10. Depending on the powder and process used, the base plate 11 may also have a building platform 12 attached as a building base on which the object 2 is built. However, object 2 can also be built on the base plate 11 itself, which then serves as a building base. In FIG. 1, the object to be built is shown in an intermediate state. It consists of several solidified layers and is surrounded by unsolidified powder material 13.

Furthermore, the device 1 comprises a storage container 14 for a powder material 15 which can be solidified by electromagnetic radiation and a recoater 16 which can be moved in a horizontal direction H to apply layers of the powder material 15 within the build area 8. Preferably, a radiation heater 17 is arranged in the process chamber 3, which serves to heat the applied powder material 15. For example, an infrared radiator 17 can be provided as radiation heater 17.

Furthermore, the device 1 comprises an irradiation device 20 with a laser 21 which generates a laser beam 22 which is deflected by a deflecting device 23 and focused by a focusing device 24 to the working plane 7 via a coupling window 25 arranged at the top of the process chamber 3 in the chamber wall 4.

Furthermore, the device 1 comprises a control device 29, by means of which the individual components of the device 1 are controlled in a coordinated manner to carry out a method for the manufacture of a three-dimensional object 2. The control device 29 may include a CPU, the operation of which is controlled by a computer program (software). The computer program may be stored separately from the device 1 on a storage medium from which it can be loaded into the device 1, particularly into the control device 29.

The laser sintering devices offered by the applicant under the type designations P110, P396, P500, P770, P800 and P810, for example, have proved to be suitable for the execution of the invention.

During operation, in order to apply a layer of the powder material 15, the support 10 is lowered by a height which preferably corresponds to the desired thickness of the layer of the powder material 15. The recoater 16 first moves to the storage container 14 and takes from it a quantity of powdered material 15 sufficient to apply a layer. Then the recoater 16 moves over the build area 8 and applies a thin layer of the powder material 15 to the building base 10, 11, 12 or a previously existing powder layer. The application is carried out at least over the entire cross-section of the object to be produced, preferably over the entire build area 8. The powder material 15 is preferably heated to a processing temperature by means of the radiant heater 17. Then the cross-section of the object to be produced 2 is scanned by the laser beam 22 so that this area of the applied layer is solidified. The steps are repeated until the object 2 is finished and can be removed from the container 5.

The invention is preferably applied to, but not limited to, laser sintering or laser melting. It may be applied to various methods as far as these concern the production of a three-dimensional object by applying and selectively solidifying a powder material layer by layer by means of exposure to electromagnetic radiation.

The irradiation device 20 may, for example, comprise one or more gas or solid-state lasers or lasers of any other kind, such as laser diodes, in particular line exposure devices using VCSEL (Vertical Cavity Surface Emitting Laser) or VECSEL (Vertical External Cavity Surface Emitting Laser). In general, any radiation source which may be used to apply electromagnetic radiation selectively to a layer of the powder material 15 may be used as an irradiation device. For example, instead of a laser, another light source or any other source of electromagnetic radiation suitable for solidifying the powder material 15 may be used. Instead of deflecting a beam, it is also possible to use exposure with a movable line irradiator. The invention may also be applied to selective mask sintering, in which a light source radiating over an area and a mask are used, or to high-speed sintering (HSS), in which a material is selectively applied to the powder material 15, which increases the radiation absorption at the positions corresponding to the cross section of the three-dimensional object 2 (absorption sintering) or reduces it at the other positions of the build area 8 (inhibition sintering), and is then exposed non-selectively over a large area or with a movable line irradiator.

According to the invention, it is preferred to preheat the powder material 15 before it is selectively sintered or melted and solidified by the exposure to electromagnetic radiation. In the course of preheating, the powdered material 15 is heated to an elevated processing temperature, so that less energy to be introduced by the electromagnetic radiation serving for selective solidification.

Within the context of the invention, commercially available mixers may be used.

For example, a Henschel mixer type FML, machine size 40 from the supplier Zeppelin Systems GmbH, Germany, may be used. This mixer is hereinafter referred to as "Henschel FML". The mixing chamber, in which the mixing material is located during operation of the mixer, has a usable volume of 13 to 36 litres.

The degree of filling of the mixer is the quotient of the volume of the powder filled into the mixer and the volume of the mixing chamber of the mixer. The volume of the powder is determined at a time before the method according to the invention is carried out. The degree of filling is hereinafter referred to as F.

Furthermore, a mixer of the type "Mixaco LAB-CM 6-12 MB/SM" with a container size of 6 litres may also be used, for example.

However, other mixers may also be used, particularly other commercially available mixers which allow the batch-wise processing of larger powder quantities on a kilogram scale in one batch.

Figure 2:
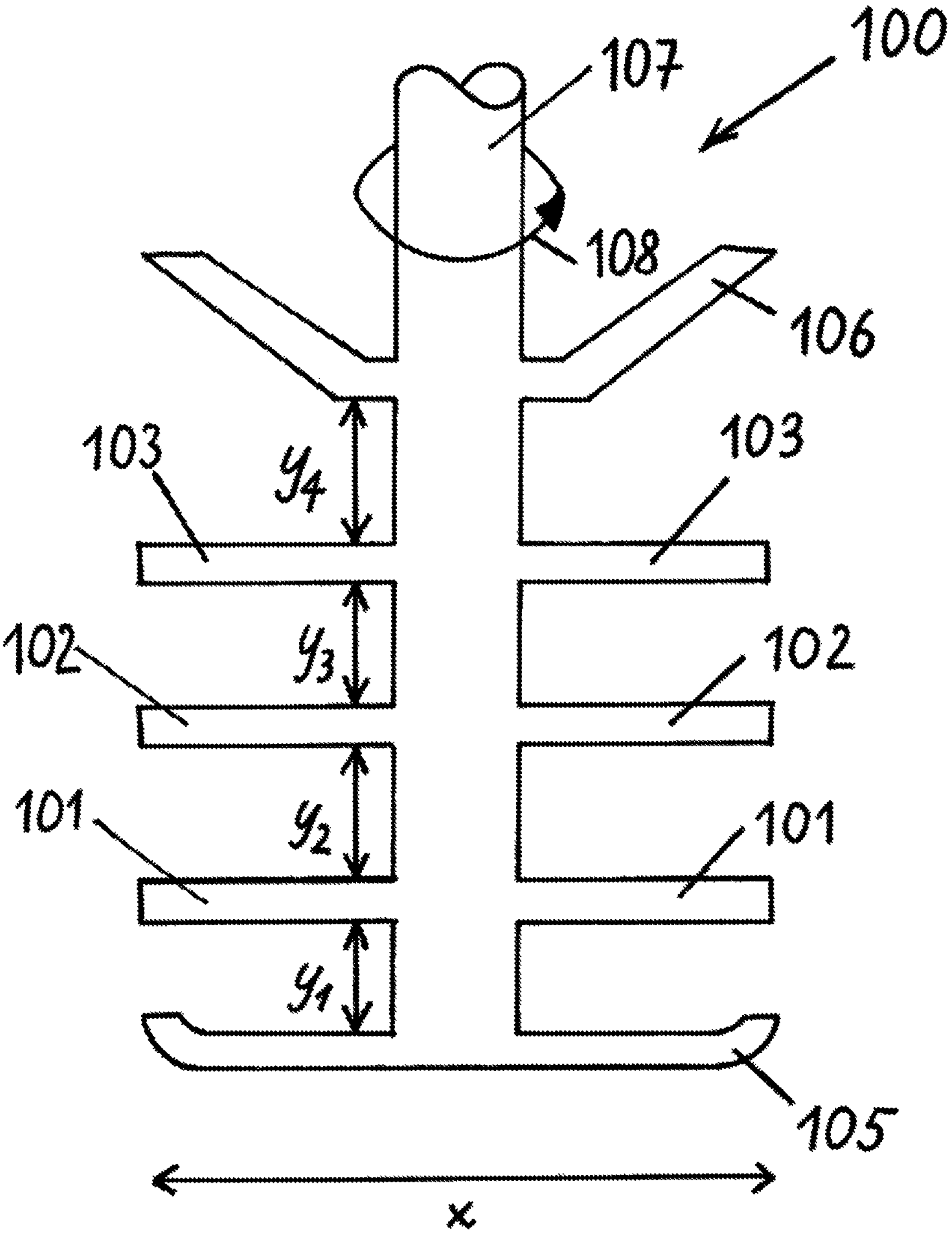
FIG. 2 shows a mixing blade arrangement which can be used according to the invention.

In FIG. 2, a mixing blade arrangement 100 is shown schematically. Examples 1 to 8 may be realised with such a mixing blade arrangement 100.

The mixing blade arrangement 100 has a shaft 107 along its length. A bottom scraper 105, three straight mixing blades 101, 102, 103 and an upwardly curved mixing horn 106 are attached to the shaft in this sequence. The mixing blades are often referred to as "mixer blades". The mixing blades 101, 102, 103 are straight, i.e. neither bent upwards nor downwards. Bottom scraper 105 and mixing horn 106 are therefore examples of mixing blades that are not straight. The mixing blades 101, 102, 103 may preferably be arranged at an inclined angle around the shaft 107. Particularly the distances between the bottom scraper 105, mixing blades 101, 102, 103 and mixing horn 106, which are called y1, y2, y3 and y4, are typically in the range of 10 to 40 mm, preferably in the range of 25 to 35 mm. The maximum lateral extension of the bottom scraper 105, the mixing blades 101, 102, 103 and the mixing horn 106 is designated as x. x corresponds to twice the mixing blade radius r. x is preferably in the range from 100 to 1000 mm, preferably in the range from 200 to 900 mm. In the case of the mixer of the "Henschel FML" type, machine size 40, for which the mixing container inside diameter is 386 mm and the mixing container height is 396 mm, x=350 mm. In case of the mixer type "Henschel FML", machine size 600, where the inner diameter of the mixing container is 1330 mm and the height of the mixing container is 1370 mm, x=870 mm. In case of the mixer of the type "Mixaco LAB-CM 6-12 CM/SM" with a container size (volume of the mixing container) of 6 litres, x=222.8 mm.

For the mixer type "Henschel FML", machine size 40, a mixer with a bottom scraper 105, a mixing horn 106 and a straight mixing blade 101 is preferred. For the mixer type "Henschel FML", machine size 600, a mixer with a bottom scraper 105, a mixing horn 106 and three straight mixing blades 101, 102, 103 is preferably used. The preferred number of mixing blades 101, 102, 103 is therefore selected depending on the size of the used mixer.

It is preferred that the mixing blades 101, 102, 103 are arranged in a twisted manner to each other relative to the shaft. For example, based on the situation shown in FIG. 2, mixing blade 102 could be arranged rotated by 90° relative to the other mixing blades 101, 103.

During operation, the mixing blade assembly 100 is located inside a mixing container (not shown in FIG. 2), inside which the powder (not shown in FIG. 2) to be treated according to the method according to the invention is also located. The bottom scraper 105 is arranged closer to the bottom of the mixing container than the mixing blades 101, 102, 103 and the mixing horn 106.

During operation, the shaft 107 is rotated around its own axis by means of a motor. The rotation is shown by the arrow 108. The bottom scraper 105, the mixing blades 101, 102, 103 and the mixing horn 106 are preferably arranged rotationally symmetrically in relation to the shaft 107, so that no imbalance occurs when the shaft rotates.

EXAMPLES

Several examples of the present invention are described below. The examples described below serve to illustrate the present invention and therefore do not limit the scope of the present invention in any way. It is obvious to the person skilled in the art that the examples described below may be altered and modified in the context of the entire disclosure. The features of the individual examples may be combined with each other wherever possible.

Example 1

In Example 1, polyphenylene sulfide powder was used. Polyphenylene sulfide (also referred to as Poly(thio-p-phenylene) and usually abbreviated as "PPS") is a high-temperature resistant thermoplastic plastic with the following repeating unit:

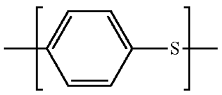

A commercially available product was used which is offered by Toray Industries, Inc., Japan under the commercial name "Toray 50NNAB". The quantiles $d_{10}$, $d_{50}$ and $d_{90}$, measured before the method according to the invention was carried out, are given in the first line "Comparison" of table 3.

A mixer of the type "Henschel FML" was used as a mixer. The casing of the mixer was not cooled.

Phase 1 refers to the heating phase, i.e. the phase up to the moment when the mixed material (powder) in the mixer reaches the maximum temperature $T_{max}$ $T_{max}$ corresponds to the treatment temperature $T_B$. The casing of the mixer only reaches the less high temperature $T_{Man}$. The revolution frequency of the mixer in phase 1 is called $D_1$. The duration of phase 1 is called $t_1$. Phase 2 is the holding phase, i.e. the phase during which the temperature reached was maintained. The revolution frequency of the mixer in phase 2 is referred to as $D_2$. The duration of phase 2 is referred to as $t_2$.

The designations $T_{max}$, $T_{Man}$, $D_1$, $D_2$, $t_1$, $t_2$ are used in the same manner in the further examples.

The method according to the invention was carried out three times with independent powder batches (nos. 1 to 3). The values for $T_{max}$, $T_{Man}$, $D_1$, $D_2$, $t_1$, $t_2$ and $t_1$+$t_2$ for the powder batches nos. 1 to 3 are stated in Table 2.

The values obtained for the bulk density S, the BET surface area, the fraction of powder particles with a particle size of <10 μm in volume percent (%<10 μm), the quantiles $d_{10}$, $d_{50}$ and $d_{90}$ of the particle size distribution and the pourability determined by means of the 25 mm nozzle are given for nos. 1 to 3 in Table 3. These are the average values from three measurements each. Comparative values for the PPS powder which has not been treated according to the invention are also given in Table 3. If no value is stated in a column and line, this means that the corresponding measurement has not been carried out.

TABLE 2

| No. | $T_{max}$ [° C.] | $T_{Man}$ [° C.] | $D_1$ [m/s] | $D_2$ [m/s] | $t_1$ [min] | t2 [min] | $t_1 + t_1$ [min] |
|---|---|---|---|---|---|---|---|
| 1 | 175 | 154 | 36.0 | 21.6 | 14 | 7 | 21 |
| 2 | 175.5 | 158 | 36.0 | 21.6 | 13 | 6 | 19 |
| 3 | 175 | 160 | 36.0 | 19.8 | 9 | 8 | 17 |

TABLE 3

| No. | S [g/cm³] | BET [m²/g] | % <10 μm | $d_{10}$ [μm] | $d_{50}$ [μm] | $d_{90}$ [μm] | Pourability [s] |
|---|---|---|---|---|---|---|---|
| Comparison | 0.458 | 15.69 | 0.4 | 38 | 72 | 126 | no free-flowing |
| 1 | 0.516 | 7.762 | 0.2 | 41 | 70 | 120 | 5.4 |
| 2 | 0.512 | — | 0.2 | 40 | 71 | 124 | 5.8 |
| 3 | 0.512 | — | 0.3 | 40 | 71 | 123 | 5.4 |

Figure 3:
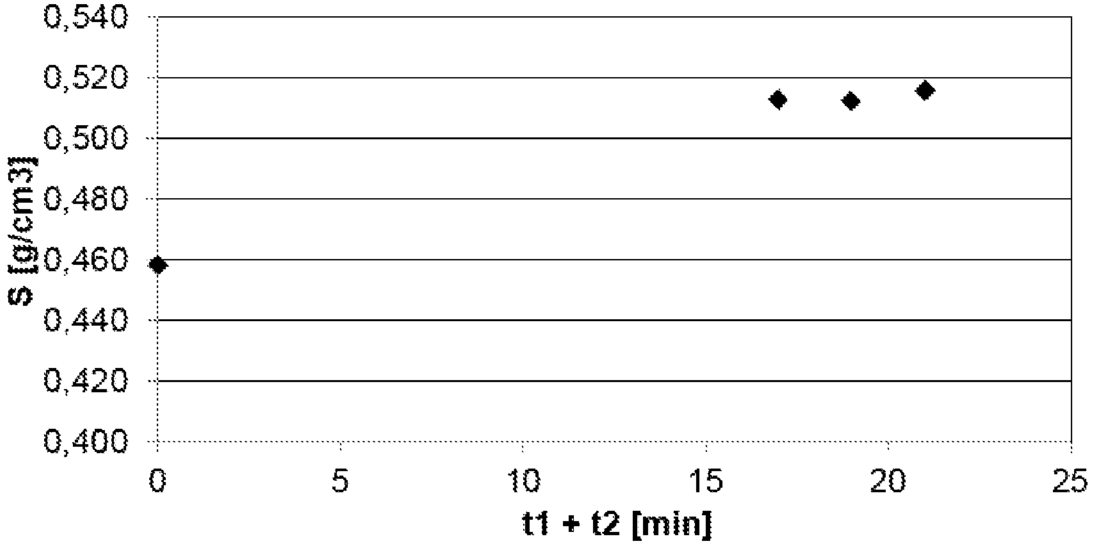
FIG. 3 shows a plot of the bulk density vs. the total treatment time for an example of the invention.

In FIG. 3, the achieved bulk density is plotted vs. the total treatment time $t_1$+$t_2$. The data point at $t_1$+$t_2$=0 represents the PPS powder that has not been treated in the manner according to the invention. From FIG. 3, it can be clearly seen that a significant increase in the bulk density was achieved by the treatment according to the invention at temperatures above the glass transition temperature $T_g$ ($T_g$ of PPS≈90 to 110° C., or 105° C. for the PPS used here; compare Table 2 for the temperature $T_{max}$ occurring during treatment). This effect was already achieved at a total treatment time of 17 min. For example at temperatures in the range between 105° C. and 180° C., depending on the production method.

In addition, the treatment has also significantly improved the pourability. While the ground powder is not free-flowing before the treatment according to the invention, it shows a good flowability of approx. 5 seconds afterwards (test with 25 mm nozzle), see Table 3.

In addition, the BET surface has been drastically reduced from approx. 16 m²/g to approx. 8 m²/g by the treatment according to the invention, cf. Table 3.

In addition, the fraction of fine powder has been significantly reduced from approx. 0.4% to approx. 0.2% as a result of the treatment according to the invention, cf. Table 3.

Example 2

In Example 2, a polyblend of 50 wt. % PPS and 50 wt. % polyetherimide (PEI) was used. In Example 2 a total of 1.65 kg of the polyblend powder was used. The powder obtained by cryogenic grinding using a pin mill is fibrous and has a very low bulk density of approx. 0.27 g/cm³. The quantiles $d_{10}$, $d_{50}$ and $d_{90}$, measured before the method according to the invention was carried out, are given in the first line of Table 5.

A mixer of the type "Mixaco LAB-CM 6-12 CM/SM" with a container size of 6 litres was used as a mixer. The casing of the mixer was not cooled.

The values for $T_{max}$, $T_{Man}$, $D_1$, $D_2$, $t_1$, $t_2$ and $t_1$+$t_2$ are stated in Table 4, wherein the powder batch of Example 2 has the number 4.

The values obtained for the bulk density S and the quantiles $d_{10}$, $d_{50}$ and $d_{90}$ of the grain size distribution are given in Table 5. They are the average values of three measurements each. Also in Table 5, comparative values are given for the powder of PPS-PEI-Polyblend, which has not been treated in the manner according to the invention. If no value is stated in a column and line, this means that the corresponding measurement has not been carried out.

TABLE 4

| No. | $T_{max}$ [° C.] | $T_{Man}$ [° C.] | $D_1$ [m/s] | $D_2$ [m/s] | $t_1$ [min] | $t_2$ [min] | $t_1 + t_1$ [min] |
|---|---|---|---|---|---|---|---|
| 4 | 146.2 | — | 34.42 | 29.17 | 15 | 10 | 25 |

TABLE 5

| No. | S [g/cm³] | $d_{10}$ [µm] | $d_{50}$ [µm] | $d_{90}$ [µm] |
|---|---|---|---|---|
| Comparison | 0.273 | 51 | 99 | 142 |
| 4 | 0.428 | 33 | 85 | 133 |

By the treatment according to the invention above the $T_g$ value of PPS ($T_g \approx 90$ to 100° C.), the bulk density could be increased very significantly to 0.428 g/cm3. This corresponds to an increase of 57%.

The application of temperatures above the $T_g$ value for PEI (approx. 215° C.) and below the melting point of PPS (approx. 275° C.) is optionally possible to achieve an even more significant increase in the bulk density.

Example 3

In Example 3, a polyether ketone ketone (PEKK) with a copolymerisation ratio of terephthalic acid units to isophthalic acid units of approx. 60:40 was used. This is a PAEK plastic.

A commercially available product was used, which is commercialised under the trade name "Kepstan 6002PF" by Arkema S.A., France. This coarse powder was ground and screened to the appropriate particle size.

A mixer of the type "Henschel FML" was used as a mixer. The casing of the mixer was cooled by water cooling.

The method according to the invention was carried out six times with independent powder batches (nos. 5 to 10). The mass of a powder batch is designated as m. The values for $T_{max}$, $T_{Man}$, m, F, $D_1$, $D_2$, $t_1$, $t_2$ and $t_1+t_2$ are stated in Table 6 for batches nos. 6 to 10. F is the degree of filling of the mixer. This designation is used in the same manner in the further examples.

The values obtained for the bulk density S, the BET surface area, the fraction of powder particles with a particle size of <10 µm in volume percent (%<10 µm) and the quantiles $d_{10}$, $d_{50}$ and $d_{90}$ of the particle size distribution are given in Table 7. These are the average values from three measurements each. Comparative values for the 60:40 PEKK powder, which has not been treated in the manner according to the invention, are also given in Table 7. If no value is stated in a column and row, this means that the corresponding measurement has not been carried out.

TABLE 6

| No. | $T_{max}$ [° C.] | $T_{Man}$ [° C.] | m [kg] | F [%] | $D_1$ [m/s] | $D_2$ [m/s] | $t_1$ [min] | $t2$ [min] | $t_1 + t_1$ [min] |
|---|---|---|---|---|---|---|---|---|---|
| 5 | 120.7 | 97 | 9 | 78.6 | 46.8 | 39.6 | 10 | 10 | 20 |
| 6 | 90.2 | 72 | 8 | 69.9 | 46.8 | 46.8 | 8 | 12 | 20 |

TABLE 6-continued

| No. | $T_{max}$ [° C.] | $T_{Man}$ [° C.] | m [kg] | F [%] | $D_1$ [m/s] | $D_2$ [m/s] | $t_1$ [min] | $t2$ [min] | $t_1 + t_1$ [min] |
|---|---|---|---|---|---|---|---|---|---|
| 7 | 113 | 91 | 9 | 78.6 | 46.8 | 46.8 | 6 | 14 | 20 |
| 8 | 120 | 97 | 9 | 78.6 | 46.8 | 46.8 | 7 | 13 | 20 |
| 9 | 129 | 104 | 9 | 78.6 | 46.8 | 46.8 | 8 | 12 | 20 |
| 10 | 70.1 | 57 | 6.6 | 57.7 | 46.8 | 46.8 | 10 | 10 | 20 |

TABLE 7

| No. | S [g/cm³] | BET [m²/g] | % <10 µm | $d_{10}$ [µm] | $d_{50}$ [µm] | $d_{90}$ [µm] |
|---|---|---|---|---|---|---|
| Comparison | 0.318 | — | — | — | — | — |
| 5 | 0.397 | 1.243 | 3.94 | 20 | 69 | 134 |
| 6 | 0.387 | 1.343 | 4.08 | 20 | 71 | 138 |
| 7 | 0.393 | 1.499 | 4.46 | 18 | 67 | 127 |
| 8 | 0.396 | 1.369 | 4.27 | 19 | 67 | 127 |
| 9 | 0.394 | 1.250 | 4.05 | 19 | 70 | 138 |
| 10 | 0.376 | 1.375 | 4.23 | 20 | 71 | 140 |

PEKK powders with a copolymerisation ratio of terephthalic acid units to isophthalic acid units of approx. 70:30 to approx. 10:90, particularly of approx. 60:40, have the following special features: If the powders are obtained by polymerisation and possibly size reduction, they are typically semi-crystalline. However, the polymer typically only crystallises from the melt if the cooling rate is less than 5° C./min, wherein the case is considered that the polymer does not comprises any fillers (unfilled PEKK). In this respect it behaves more like an amorphous polymer and less like a semi-crystalline polymer.

If the powder shows amorphous behaviour due to rapid cooling, the HDT-A value is 139° C. The HDT-B value is closer to $T_g$ (approx. 155° C.). If the powder shows semi-crystalline behaviour due to slower cooling, the HDT-A value is between $T_g$ and $T_m$.

Significant and possibly maximum increases in bulk densities may be achieved during heating up to $T_g$. But even at $T_g+20°$ C. a significant increase in the bulk density may still be achieved. The 60:40 copolymer has a $T_g$ value of 155° C. and a melting point of about 300° C.

Significant and possibly maximum increases in the bulk density could already be achieved at treatment times of significantly less than 30 minutes. Herein, the treatment time depends on the initial bulk density of the powder (compare also Examples 4 and 5) and the mass m of the powder in the mixer.

The bulk density may be increased depending on the treatment temperature. The treatment temperature is preferably between 110 and 155° C. Above $T_g$, the bulk density decreases again slightly (compare also Examples 4 and 5). Below 90° C. the bulk density does not yet reach a maximum.

Figure 4:
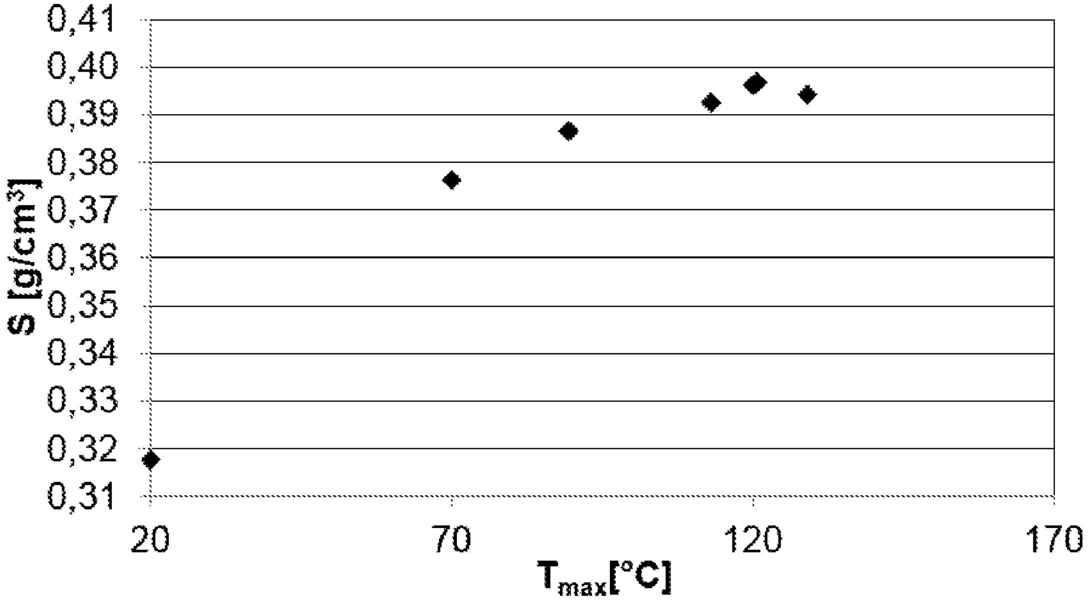
FIG. 4 shows a plot of the bulk density vs. the maximum temperature occurring in the mixer during treatment for a further example of the present invention.

In FIG. 4, the achieved bulk density is plotted vs. the maximum temperature $T_{max}$ occurring in the mixer during the treatment. The data point at $T_{max}=20°$ C. (room temperature) represents 60:40 PEKK powder that has not been treated in the manner according to the invention. From FIG. 4, it can be clearly seen that very strongly improved bulk densities are achieved by the treatment according to the invention at temperatures beyond approx. 90° C., and particularly that at approx. 120° C., optimised, i.e. maximum bulk densities are achieved.

Figure 5:
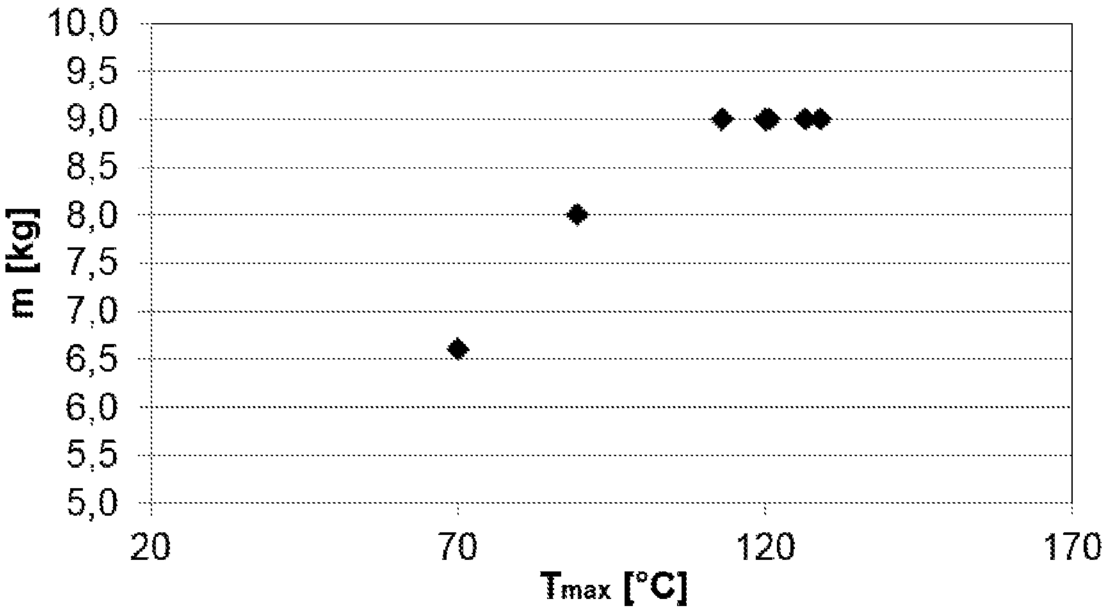
FIG. 5 shows the relationship between maximum temperature and powder mass for this example, wherein the actually dependent variable is plotted on the abscissa.

The maximum temperature which may be achieved in the mixer used at the most possible rotation speed of 2600 rpm depends on the degree of filling of the mixer. With the polymer powder used in this Example, sufficient shear energy is only introduced into the mixer for a mass beyond approx. 9 kg, so that the temperature may rise to approx. 110° C. or above when the mixer casing is cooled with water. In FIG. 5, the relationship between powder mass m and $T_{max}$ is shown, wherein the actually dependent variable $T_{max}$ is plotted on the abscissa.

For other types of mixers or other sizes of the mixer, a different powder mass than 9 kg may be more suitable. This must be determined iteratively for each mixer and for each powder. This determination may be based on a series of measurements corresponding to the series of measurements shown in FIG. 5.

Example 4

In Example 4, the PEKK with a copolymerisation ratio of terephthalic acid units to isophthalic acid units of approx. 60:40 was used, which was also used in Example 3. The product commercialised under the commercial name "Kepstan 6002PL" by Arkema S.A., France was used directly.

The powder used in Example 4 differed from the powder used in Example 3 with respect to the bulk density that was present before the method according to the invention was carried out (so-called "initial bulk density"). The initial bulk density was much lower in the case of Example 4 (0.271 g/cm$^3$ compared to 0.318 g/cm$^3$).

As a mixer, again a mixer of the type "Henschel FML" was used. The casing of the mixer was not cooled, except for powder batch no. 12. In the case of powder batch no. 12, cooling took place as described in Example 3.

The method according to the invention was carried out ten times with independent powder batches (nos. 11 to 20). The mass of a powder batch is designated as m. The values for $T_{max}$, $T_{Man}$, m, $D_1$, $D_2$, $t_1$, $t_2$ and $t_1$+$t_2$ are given in Table 8 for powder batches nos. 11 to 20.

The obtained values for the bulk density S are given in Table 9. They are the average values of three measurements each. Also in Table 9, the comparative value for the 60:40 PEKK powder that has not been treated according to the invention is given.

TABLE 8

| No. | $T_{max}$ [° C.] | $T_{Man}$ [° C.] | m [kg] | F [%] | $D_1$ [m/s] | $D_2$ [m/s] | $t_1$ [min] | t2 [min] | $t_1$ + $t_1$ [min] |
|---|---|---|---|---|---|---|---|---|---|
| 11 | 151 | 138 | 9 | 92.4 | 46.8 | 46.8 | 19 | 10 | 29 |
| 12 | 99.8 | 83 | 9 | 92.4 | 46.8 | 46.8 | 30 | 10 | 40 |
| 13 | 164 | 146 | 9.5 | 97.5 | 46.8 | 32.4 | 31 | 9 | 40 |
| 14 | 158.7 | 140 | 9 | 92.4 | 46.8 | 36.0 | 20 | 10 | 30 |
| 15 | 148 | 118 | 9 | 92.4 | 46.8 | 46.8 | 14 | 0 | 14 |
| 16 | 146 | 127 | 9 | 92.4 | 46.8 | 46.8 | 16 | 5 | 21 |
| 17 | 148 | 128 | 9 | 92.4 | 46.8 | 46.8 | 16 | 10 | 26 |
| 18 | 153.4 | 136 | 9 | 92.4 | 46.8 | 36.0 | 18 | 15 | 33 |
| 19 | 148.3 | 130 | 9 | 92.4 | 46.8 | 34.2 | 14 | 10 | 24 |
| 20 | 153 | 135 | 9 | 92.4 | 46.8 | 34.2 | 16 | 10 | 26 |

TABLE 9

| No. | S [g/cm$^3$] |
|---|---|
| Comparison | 0.271 |
| 11 | 0.344 |
| 12 | 0.340 |
| 13 | 0.327 |
| 14 | 0.340 |
| 15 | 0.336 |

TABLE 9-continued

| No. | S [g/cm$^3$] |
|---|---|
| 16 | 0.344 |
| 17 | 0.352 |
| 18 | 0.350 |
| 19 | 0.348 |
| 20 | 0.346 |

Figure 6:
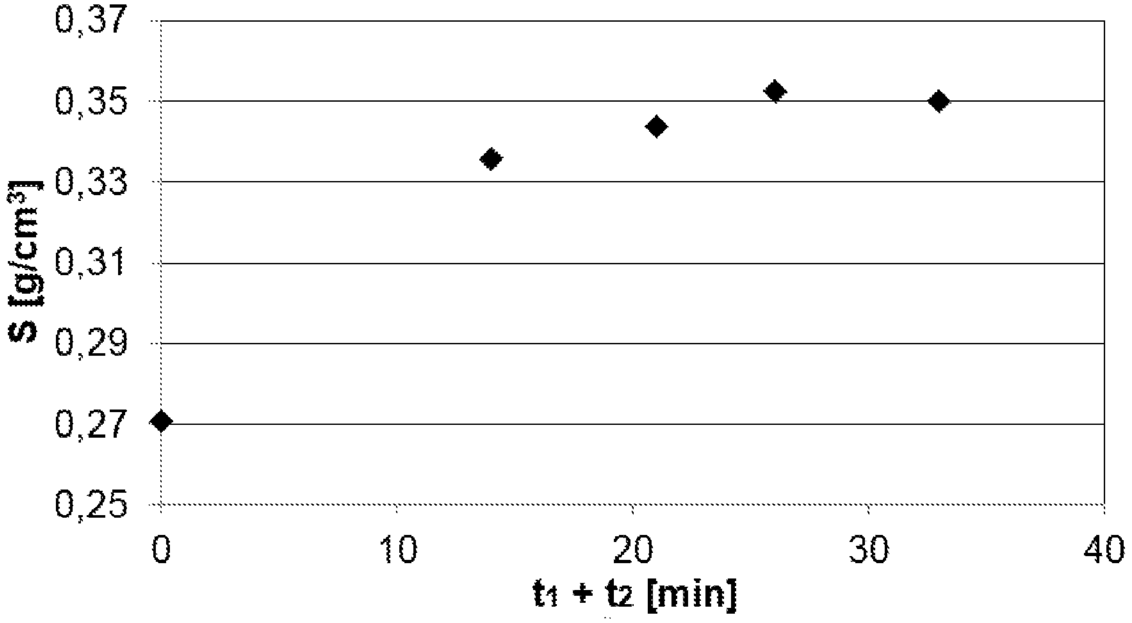
FIG. 6 shows a plot of the bulk density vs. the total treatment time for a further example of the present invention.

In FIG. 6, the achieved bulk density is plotted vs. the total treatment time $t_1$+$t_2$. The data point at $t_1$+$t_2$=0 represents the PEKK-powder which has not been treated in the manner according to the invention. FIG. 6 clearly shows that a significant increase in the bulk density was achieved by the treatment according to the invention. This effect was essentially already achieved with a total treatment time of 14 minutes.

Figure 7:
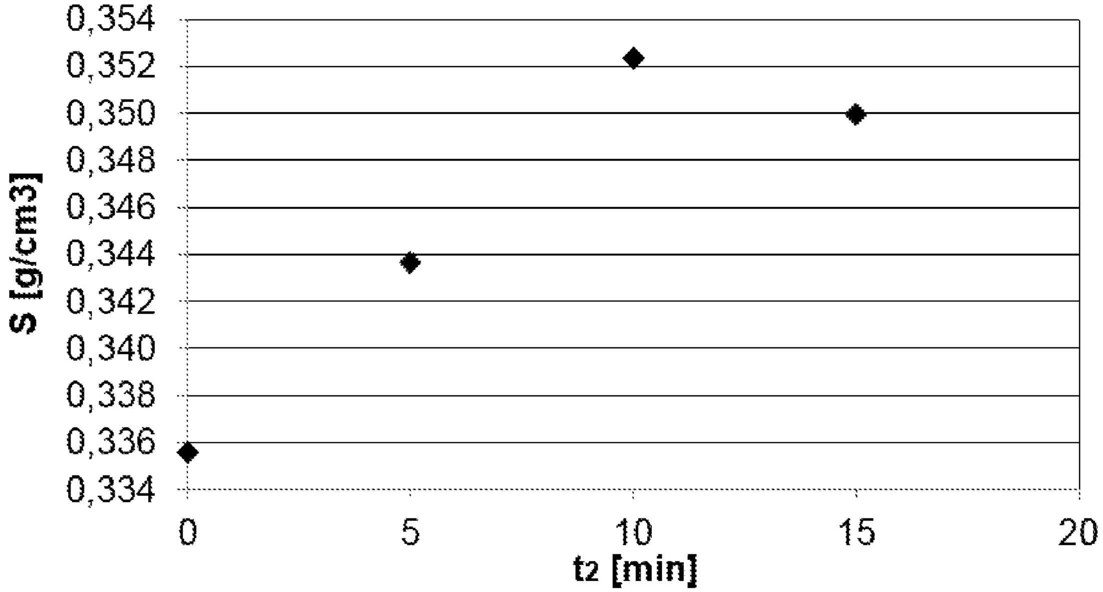
FIG. 7 shows a plot of the bulk density vs. the holding time for this example.

In FIG. 7, the achieved bulk density is plotted vs. the holding time $t_2$. Selected data points are shown. The data point at $t_2$=0 represents the PEKK-powder which was not treated in the manner according to the invention. FIG. 7 shows that a holding time of 10 min leads to optimal results in many cases.

The PEKK powder used in Example 4 had a lower initial bulk density than the PEKK powder used in Example 3 (0.271 g/cm$^3$ compared to 0.318 g/cm$^3$, see line "Comparison" in Tables 7 and 9). With a powder mass m=9 kg in the mixer, the powder used in Example 4 reached at most 99.8° C. in the mixer (temperature of the mixed material) when the casing of the mixer was cooled by water cooling. Furthermore, in this case more time was needed to reach this maximum temperature $T_{max}$. Without cooling the mixer casing, higher temperatures could be reached in a shorter time with the powder used in Example 4 in the mixer.

The required mixing time in the mixer is therefore strongly dependent on the bulk density of the powder. This is taken into account in the invention.

But even with the powder used in Example 4, a practically maximum increase in the bulk density could be achieved with total treatment times $t_1$+$t_2$ of considerably less than 30 minutes. After 26 minutes, a plateau of 0.35 g/cm$^3$ is achieved, which does not increase even with longer treatment duration. The greatest increase in the bulk density is already achieved after 15-20 minutes of total treatment duration. Afterwards, the bulk density increases only slightly in relative terms.

Example 5

In Example 5, the PEKK with a copolymerization ratio of terephthalic acid units to isophthalic acid units of approx. 60:40 was used, which was also used in Examples 3 and 4. Again, the product distributed under the trade name "Kepstan 6002PF" by Arkema S.A., France was used. This coarse powder was ground on an impact mill and sieved to the appropriate particle size.

As a mixer, again a mixer of the type "Henschel FML" was used. With the exception of powder batch no. 23, the casing of the mixer was cooled by means of water cooling. In the case of powder batch no. 23, there was no cooling.

The method according to the invention was performed three times with independent powder batches (nos. 21 to 23). The mass of a powder batch is designated as m. The values for $T_{max}$, m, F, $D_1$, $D_2$, $t_1$, $t_2$ and $t_1$+$t_2$ are given for nos. 21 to 23 in Table 10. If no value is entered in a column and line, this means that the corresponding measurement has not been carried out.

The values obtained for the bulk density S and the BET surface area are given in Table 11. These are the average values from three measurements each. Table 11 also shows the comparative value for the 60:40 PEKK powder that was not treated in a manner according to the invention.

The powders of the batches nos. 21, 22 and 23 were mixed to ⅓ mass % each and then exposed to a temperature of 270° C. in a circulating air furnace under a nitrogen atmosphere for a period of 2 hours. 270° C. corresponds approximately to the onset of the melting peak observed in the DSC. The values for the bulk density measured afterwards are also shown in Table 11 ("270° C./2 h").

TABLE 10

| No. | $T_{max}$ [° C.] | $T_{Man}$ [° C.] | m [kg] | F [%] | $D_1$ [m/s] | $D_2$ [m/s] | $t_1$ [min] | t2 [min] | $t_1 + t_1$ [min] |
|---|---|---|---|---|---|---|---|---|---|
| 21 | 107 | 82 | 8.5 | 87.3 | 45.0 | 46.8 | 6 | 14 | 20 |
| 22 | 94 | 75 | 8.5 | 87.3 | 46.8 | 46.8 | 10 | 10 | 20 |
| 23 | 165 | — | 8.5 | 87.3 | 45.0 to 46.8 | 32.4 | 23 | 10 | 33 |

TABLE 11

| No. | S [g/cm³] | BET [m²/g] |
|---|---|---|
| Comparison | 0.352 | 1.618 |
| 21 | 0.410 | 1.289 |
| 22 | 0.409 | 1.438 |
| 23 | 0.389 | 0.775 |
| 270° C./2 h | 0.370 | 0.758 |

From the values in Table 11, it is clearly visible that the treatment according to the invention resulted in a significant increase in the bulk density and a significant reduction in the BET surface area after considerably less than 30 minutes. At a treatment time of 33 min and a $T_{max}$ value of 165° C., the bulk density is comparatively much lower. An even lower BET was obtained when the powder, which had been treated according to the invention, was exposed to a temperature of 270° C. for a period of 2 hours.

Figure 8:
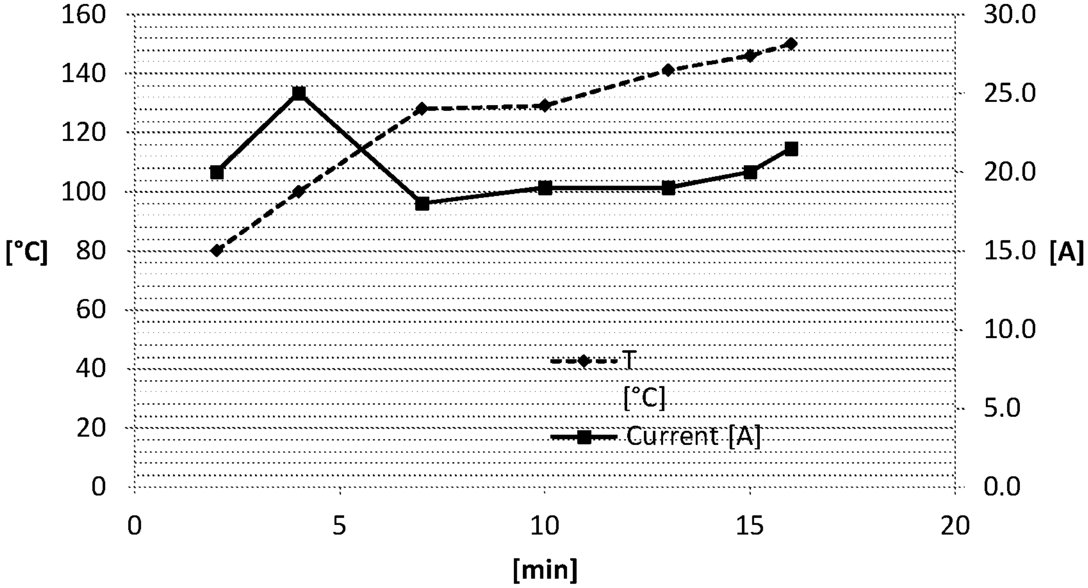
FIG. 8 shows in a temperature-current consumption diagram the change in current consumption in the mixer over time compared to the increase in temperature in experiment V23 of Example 5.

FIG. 8 shows in a temperature-current consumption diagram the change in current consumption in the mixer over time compared to the increase in temperature for sample no. 23. It can be seen that the current consumption increases disproportionately by more than 5% at the temperature $T_B$max of 150° C.

From the following tabular presentation of the temperature-current consumption diagram, it can be seen that $T_B$max presently with PEKK 60/40 may be at least at approx. 150° C. and preferably at 154° C., due to the respective gradient of approx. 7% and approx. 10.5% compared to the respective previous value for current consumption.

| Time [min] | T [° C.] | Strom [A] | rotation speed [rpm] | dA (f = ax) gradient between the last two points | gradient/ current consumption [%] | Δ T [° C.] |
|---|---|---|---|---|---|---|
| 2 | 80 | 20.0 | 2500 | | 0.00% | |
| 4 | 100.0 | 25.0 | 2500 | 2.5 | 10.00% | 20.0 |
| 7 | 128.0 | 18.0 | 2600 | −2.333333333 | −12.96% | 28.0 |
| 10 | 129.0 | 19.0 | 2600 | 0.333333333 | 1.75% | 1.0 |
| 13 | 141.0 | 19.0 | 2600 | 0 | 0.00% | 12.0 |
| 15 | 146.0 | 20.0 | 2600 | 0.5 | 2.50% | 5.0 |
| 16 | 150.0 | 21.5 | 2600 | 1.5 | 6.98% | 4.0 |
| 17 | 154.0 | 24.0 | 2600 | 2.5 | 10.42% | 4.0 |

-continued

| Time [min] | T [° C.] | Strom [A] | rotation speed [rpm] | dA (f = ax) gradient between the last two points | gradient/ current consumption [%] | Δ T [° C.] |
|---|---|---|---|---|---|---|
| 19 | 159.0 | | 2000 | | | 5.0 |
| 21 | 163.0 | | 2000 | | | 4.0 |
| 23 | 165.0 | | 2000 | | | 2.0 |

Example 6

In Example 6, a PEKK with a copolymerization ratio of terephthalic acid units to isophthalic acid units of approx. 60:40 was used. The product distributed under the trade name "Kepstan 6003PF" by Arkema S.A., France was used. This coarse powder was ground on an impact mill and screened to the appropriate particle size.

As a mixer, again a mixer of the type "Henschel FML" was used. The casing of the mixer was not cooled.

The method according to the invention was performed with a single powder batch (no. 24). The values for $T_{max}$, $D_1$, $D_2$, $t_1$, $t_2$ and $t_1+t_2$ are given in Table 12.

The values obtained for the bulk density S, the BET surface area, the fraction of powder particles with a particle size of <10 μm in volume percent (%<10 μm), the quantiles $d_{10}$, $d_{50}$ and $d_{90}$ of the particle size distribution are given in Table 13. These are the average values from three measurements each. Comparative values for the 60:40 PEKK powder, which has not been treated in the manner according to the invention, are also given in Table 13.

TABLE 12

| No. | $T_{max}$ [° C.] | $D_1$ [m/s] | $D_2$ [m/s] | $t_1$ [min] | t2 [min] | $t_1 + t_1$ [min] |
|---|---|---|---|---|---|---|
| 24 | 155 | 46.8 | 21.6 to 27.0 | 7 | 10 | 17 |

TABLE 13

| No. | S [g/cm³] | BET [m²/g] | % <10 μm | $d_{10}$ [μm] | $d_{50}$ [μm] | $d_{90}$ [μm] |
|---|---|---|---|---|---|---|
| Comparison | 0.307 | 1.900 | 5 | 17 | 56 | 109 |
| 24 | 0.359 | 1.200 | 4.2 | 18 | 52 | 100 |

From the values in Table 13, it is clearly visible that by the treatment according to the invention, a significant increase in the bulk density as well as a significant reduction in the BET surface area and a significant reduction in the ultra-fine powder percentage (%<10 μm) could be achieved already after a treatment time of 17 min.

Example 7

In Example 7, a PEKK with a copolymerization ratio of terephthalic acid units to isophthalic acid units of approx. 60:40 was used. The product distributed under the trade name "Kepstan 6003PF" by Arkema S.A., France was used as in Example 6. This coarse powder was ground on an impact mill and screened to the appropriate particle size.

As a mixer, again a mixer of the type "Henschel FML" was used. The casing of the mixer was not cooled.

The method according to the invention was performed with a single powder batch (no. 25). The mass of a powder batch is designated as m. The values for $T_{max}$, m, $D_1$, $D_2$, F, $t_1$, $t_2$ and $t_1+t_2$ are given in Table 14.

The value obtained for the bulk density S is given in Table 15. This is the average value from three measurements. Table 15 also shows the comparative value for the 60:40 PEKK powder that was not treated in a manner according to the invention.

TABLE 14

| No. | $T_{max}$ [° C.] | m [kg] | F [%] | $D_1$ [m/s] | $D_2$ [m/s] | $t_1$ [min] | t2 [min] | $t_1 + t_1$ [min] |
|---|---|---|---|---|---|---|---|---|
| 25 | 160 | 7 | 71.9 | 46.8 | 32.4 | 23 | 2 | 25 |

TABLE 15

| No. | S [g/cm$^3$] |
|---|---|
| Comparison | 0.284 |
| 25 | 0.354 |

From the values in Table 15, it is clearly visible that by the treatment according to the invention, a significant increase in the bulk density could be achieved already after a treatment time of 25 min.

Example 8

In Example 8, a PEKK with a copolymerization ratio of terephthalic acid units to isophthalic acid units of approx. 60:40 which comprised approx. 36 wt. % carbon fibres as filler (reinforcement material) was used. A PEKK powder with carbon fibres incorporated in the core produced by the company ALM LLC was used.

As a mixer, again a mixer of the type "Henschel FML" was used. The casing of the mixer was not cooled.

The method according to the invention was performed with a single powder batch (no. 26). The values for $T_{max}$, $D_1$, $D_2$, $t_1$, $t_2$ and $t_1+t_2$ are given in Table 16.

The value obtained for the bulk density S is given in Table 17. This is the average value from three measurements. Table 17 also shows the comparative value for the 60:40 PEKK powder with 36 wt. % carbon fibres that was not treated in a manner according to the invention.

TABLE 16

| No. | $T_{max}$ [° C.] | $D_1$ [m/s] | $D_2$ [m/s] | $t_1$ [min] | t2 [min] | $t_1 + t_1$ [min] |
|---|---|---|---|---|---|---|
| 26 | 166 | 46.8 | 27.0 | 8 | 8 | 16 |

TABLE 17

| No. | S [g/cm$^3$] |
|---|---|
| Comparison | 0.464 |
| 26 | 0.512 |

From the values in Table 17, it is clearly visible that by the treatment according to the invention, a significant increase in the bulk density of the carbon fibre reinforced PEKK powder could be achieved already after a treatment time of 16 min.

In this context, the following should be noted, which is not only valid in the context of Example 8 but in general in connection with fibre reinforced plastics: For PEKK without fibres and PEKK with fibres, it was found in the experiments that the increase in bulk density may be carried out at similar temperatures. This means that within the context of the invention the same or at least similar treatment temperatures $T_B$ are preferred for fibre-reinforced polymers and also other composites as for the non-reinforced polymers.

Example 9

In Example 9, the same polyphenylene sulfide (semi-crystalline) powder as in Example 1 was used ("Toray 50NNAB" from Toray Industries, Inc., Japan). This has a melting point of 293° C. and a $T_g$ of 105° C., determined according to DIN EN ISO11357 and an MVR (melt viscosity) value of 25 cm$^3$/10 min, determined via ISO1133 at 315° C. and 2.16 kg.

As a mixer, a mixer of the type "Mixaco LAB-CM 6-12 CM/SM" was used. The casing of the mixer was not cooled.

The treatment temperature below the $T_g$ was varied between 64 and 87° C. and the holding time was kept constant at 10 minutes in each case. The heating time varied between 1.5 and 4 minutes.

TABLE 18

| No. | $T_{max}$ [° C.] | $D_1$ [m/s] | $D_2$ [m/s] | $t_1$ [min] | t2 [min] | $t_1 + t_1$ [min] |
|---|---|---|---|---|---|---|
| Comparison | | | | | | 0 |
| 1 | 64 | 34.4 | 8.8 | 1.5 | 10 | 11.5 |
| 2 | 74.8 | 34.4 | 12.3 | 3 | 10 | 13 |
| 3 | 86.7 | 34.4 | 14.6 | 4 | 10 | 14 |

TABLE 19

| No. | S [g/cm$^3$] | BET [m$^2$/g] | % <10 µm | d10 [µm] | d50 [µm] | d90 [µm] | Pour-ablility [s] |
|---|---|---|---|---|---|---|---|
| Comparison | 0.459 | 15.73 | 0.4 | 37.98 | 72 | 126.13 | no free-flowing |
| 1 | 0.505 | 14.94 | 0.3 | 39.9 | 72.6 | 128.1 | 4.367 |
| 2 | 0.512 | 14.98 | 0.3 | 38.9 | 71.8 | 119.9 | 4.567 |
| 3 | 0.515 | 14.09 | 0.3 | 39.8 | 71.6 | 125.5 | 4.300 |

An increase in the bulk density could already be achieved at a temperature of $T_g$−40° C. At a temperature of $T_g$−30° C. to $T_g$−19° C. the increase in bulk density is at a maximum.

Furthermore, the pourability has also improved significantly as a result of the treatment. While the ground powder is not free-flowing before the treatment according to the invention, it shows a good flowability of approx. 4.5 seconds afterwards (test with 25 mm nozzle), cf. table 19.

The BET decreases only slightly with increasing treatment temperature below $T_g$, while above $T_g$ (see Example 1, V1-V3, $T_B$=175° C.), it decreases significantly to about 7.5 m$^2$/g.

In addition, the percentage of ultra-fine powder has been significantly reduced from approx. 0.4% to approx. 0.3% as a result of the treatment according to the invention, see also Table 3.

Example 10

A commercially available semi-crystalline polyether ether ketone (PEEK) of the company Victrex plc (Thornton Cleveleys, Great Britain), of the type PEEK 150PF, with a melting point of 343° C. and a $T_g$ of 143° C. was used.

As the mixer, a mixer of the type "Mixaco LAB-CM 6-12 CM/SM" was used. The casing of the mixer was not cooled.

The treatment temperature was varied between 103 and 156° C. and the holding time was kept constant with 10 minutes each.

TABLE 20

| No. | $T_{max}$ [° C.] | $D_1$ [m/s] | $D_2$ [m/s] | $t_1$ [min] | t2 [min] | $t_1 + t_1$ [min] |
|---|---|---|---|---|---|---|
| Comparison | 0 | | | | | 0 |
| V1 | 103.1 | 34.4 | 24.5 | 10 | 10 | 20 |
| V2 | 132.2 | 34.4 | 28.0 | 21 | 10 | 31 |
| V3 | 156 | 34.4 | 34.4 | 32 | 10 | 42 |

TABLE 21

| No. | S [g/cm$^3$] | BET [m$^2$/g] | % <10 µm | d10 [µm] | d50 [µm] | d90 [µm] | Pourability [s] |
|---|---|---|---|---|---|---|---|
| Comparison | 0.313 | 43.86 | 5.1 | 13.70 | 40.14 | 84.67 | not pourable |
| V1 | 0.368 | 35.06 | 5.6 | 13.04 | 41.20 | 87.20 | not pourable |
| V2 | 0.382 | 25.77 | 7.2 | 11.41 | 36.37 | 80.23 | not pourable |
| V3 | 0.399 | 16.47 | 5.7 | 12.59 | 40.71 | 90.32 | not pourable |

An increase in the bulk density could already be achieved at a temperature of $T_g$−40° C., a further increase is achieved at $T_g$−11° C. At a temperature above $T_g$ at $T_g$+13 and at the same time in the range between HDT-A and HDT-B for PEEK (compare also Table 1) the increase in bulk density is at a maximum.

The BET decreases with increasing treatment temperature already below $T_g$; above $T_g$ and in the HDT-A and HDT-B range, it may be significantly further reduced. It must be assumed that the BET may be further reduced at temperatures above HDT-B and below $T_m$.

The particle size distribution changes only slightly over the treatment temperature.

Figure 9:
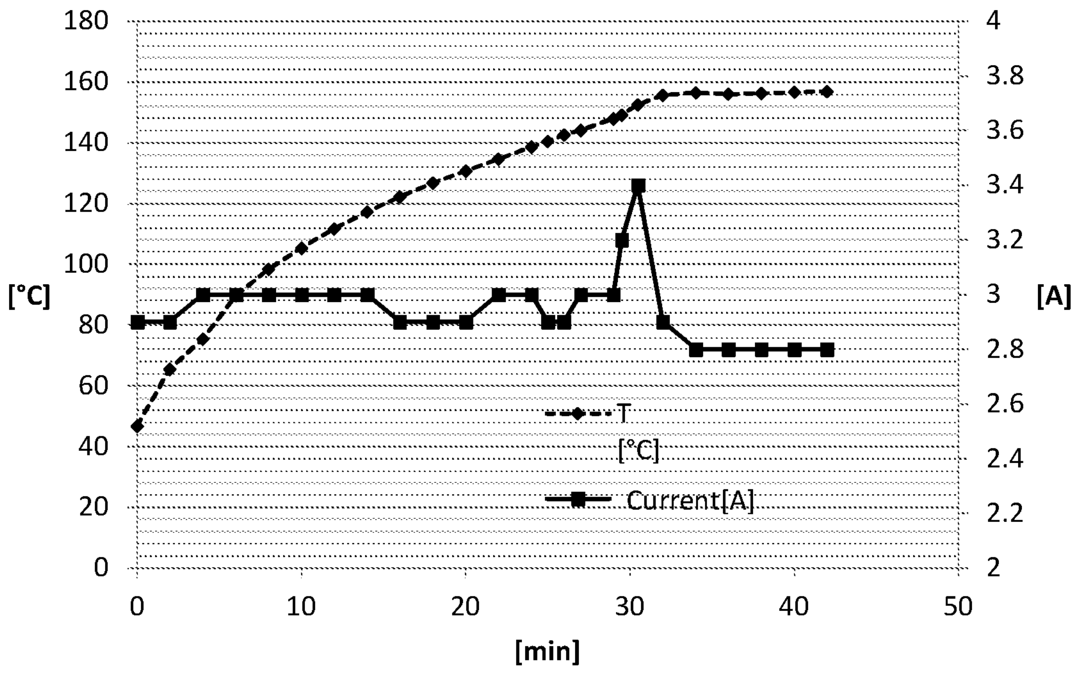
FIG. 9 shows in a temperature-current consumption diagram the change in current consumption in the mixer over time compared to the increase in temperature in experiment V3 of Example 10.

The change in current consumption in the mixer over time in line with the increase in temperature for the experiment V3 ($T_B$=156° C.) can be seen in FIG. 9 and in Table 22 below. Up to $T_g$, the current consumption is essentially constant. It can be seen that between $T_g$ and HDT-A value there is a short-term increase in the current consumption from 3.0 A to 3.4 A. Above HDT-A this then drops even to a slightly lower value of 2.8 A than below $T_g$ (2.9-3.0 A), which indicates a better pourability of the powder and thus less shear, which leads to lower current consumption. The temperature no longer rises further due to the improved pourability and remains at around 156° C. despite the same rotation speed. Therefore, the maximum treatment temperature has not yet been reached at 156° C. for PEEK. A higher treatment temperature could not be realised with this setup, because the mixer has already worked at maximum rotation speed during the heating phase and holding phase. By using a PEEK with a higher initial bulk density, a different degree of filling or the use of a mixer with a higher speed, such as the mixer of the type "Henschel FML", however, this may probably be realised. It is also likely that the time required for the heating phase may be significantly reduced.

As can be seen in particular from Table 22, $T_B$max may be most effectively defined as at most 150° C. for PEEK 150PF (specifically 149.1° C. due to a gradient of 12.5% compared to the previous value for current consumption).

TABLE 22

| Time [min] | T [° C.] | Current [A] | rotation speed [U/min] | a (f = ax) gradient between 2 data points | gradient/current consumption [%] | Δ T [° C.] |
|---|---|---|---|---|---|---|
| 0 | 46.7 | 2.9 | | | 0.00% | |
| 2 | 65.5 | 2.9 | | 0.000 | 0.00% | 18.8 |
| 4.0 | 75.4 | 3.0 | | 0.050 | 1.67% | 9.9 |
| 6.0 | 89.5 | 3.0 | | 0.000 | 0.00% | 14.1 |
| 8.0 | 98.3 | 3.0 | | 0.000 | 0.00% | 8.8 |
| 10.0 | 105.2 | 3.0 | | 0.000 | 0.00% | 6.9 |
| 12.0 | 111.5 | 3.0 | | 0.000 | 0.00% | 6.3 |
| 14.0 | 117.2 | 3.0 | | 0.000 | 0.00% | 5.7 |
| 16.0 | 122.0 | 2.9 | | −0.050 | −1.72% | 4.8 |
| 18.0 | 126.7 | 2.9 | | 0.000 | 0.00% | 4.7 |
| 20.0 | 130.6 | 2.9 | | 0.000 | 0.00% | 3.9 |
| 22.0 | 134.6 | 3.0 | | 0.050 | 1.67% | 4.0 |
| 24.0 | 138.5 | 3.0 | | 0.000 | 0.00% | 3.9 |
| 25.0 | 140.4 | 2.9 | | −0.100 | −3.45% | 1.9 |
| 26.0 | 142.5 | 2.9 | | 0.000 | 0.00% | 2.1 |
| 27.0 | 144.1 | 3.0 | | 0.100 | 3.33% | 1.6 |
| 29.0 | 147.9 | 3.0 | | 0.000 | 0.00% | 3.8 |
| 29.5 | 149.1 | 3.2 | | 0.400 | 12.50% | 1.2 |
| 30.5 | 152.3 | 3.4 | | 0.200 | 5.88% | 3.2 |
| 32.0 | 155.6 | 2.9 | | −0.333 | −11.49% | 3.3 |
| 34.0 | 156.3 | 2.8 | | −0.050 | −1.79% | 0.7 |
| 36.0 | 156.0 | 2.8 | | 0.000 | 0.00% | −0.3 |
| 38.0 | 156.1 | 2.8 | | 0.000 | 0.00% | 0.1 |
| 40.0 | 156.5 | 2.8 | | 0.000 | 0.00% | 0.4 |
| 42.0 | 156.8 | 2.8 | | 0.000 | 0.00% | 0.3 |

Example 11

A commercially available semi-crystalline polyether ether ketone (PEEK) from the company EOS GmbH (Krailling, Germany) of the type PEEK-HP3 with a melting point of 372° C. and a Tg of 164° C. was used.

A mixer of the type "Mixaco LAB-CM 6-12 CM/SM" was used as mixer. The casing of the mixer was not cooled.

The treatment temperature was varied between 75 and 192° C. and the holding time was kept constant with 10 minutes each. A higher treatment temperature could not be realised with this mixer type, as the at highest possible temperature is 200° C.

TABLE 23

| No. | $T_{max}$ [° C.] | $D_1$ [m/s] | $D_2$ [m/s] | $t_1$ [min] | t2 [min] | $t_1 + t_1$ [min] |
|---|---|---|---|---|---|---|
| Comparison | | | | | | 0 |
| V1 | 75 | 34.4 | 9.9 | 2 | 10 | 12 |
| V2 | 126.6 | 34.4 | 16.3 | 5 | 10 | 15 |
| V3 | 148 | 34.4 | 18.1 | 8 | 10 | 18 |
| V4 | 192 | 34.4 | 23.3 | 15 | 10 | 25 |

TABLE 24

| No. | S [g/cm$^3$] | BET [m$^2$/g] | % <10 µm | d10 [µm] | d50 [µm] | d90 [µm] | Pourability [s] |
|---|---|---|---|---|---|---|---|
| Comparison | 0.454 | 1.37 | 0.9 | 27.59 | 51.03 | 79.64 | not pourable |
| V1 | 0.459 | 1.16 | 0.9 | 27.17 | 50.39 | 77.01 | not pourable |

TABLE 24-continued

| No. | S [g/cm³] | BET [m²/g] | % <10 μm | d10 [μm] | d50 [μm] | d90 [μm] | Pourability [s] |
|---|---|---|---|---|---|---|---|
| V2 | 0.486 | 1.13 | 0.7 | 27.66 | 51.38 | 78.77 | not pourable |
| V3 | 0.483 | 1.08 | 0.9 | 26.82 | 50.76 | 79.74 | not pourable |
| V4 | 0.507 | | 0.8 | 30.56 | 53.94 | 81.21 | not pourable |

Only a minimal increase in bulk density of about 1% could be achieved at a temperature of Tg−89° C., a significant increase to approximately the same level of 0.48 is achieved at Tg−39° C. and Tg−17° C. At a temperature above Tg and above the HDT-A value (compare Table 1) at Tg+27 the increase in bulk density is at a maximum.

The BET decreases with increasing treatment temperature, even already below the Tg.

The particle size distribution changes only insignificantly over the treatment temperature below Tg. Above Tg, it increases slightly, which also explains the slightly improved pourability.

Figure 10:
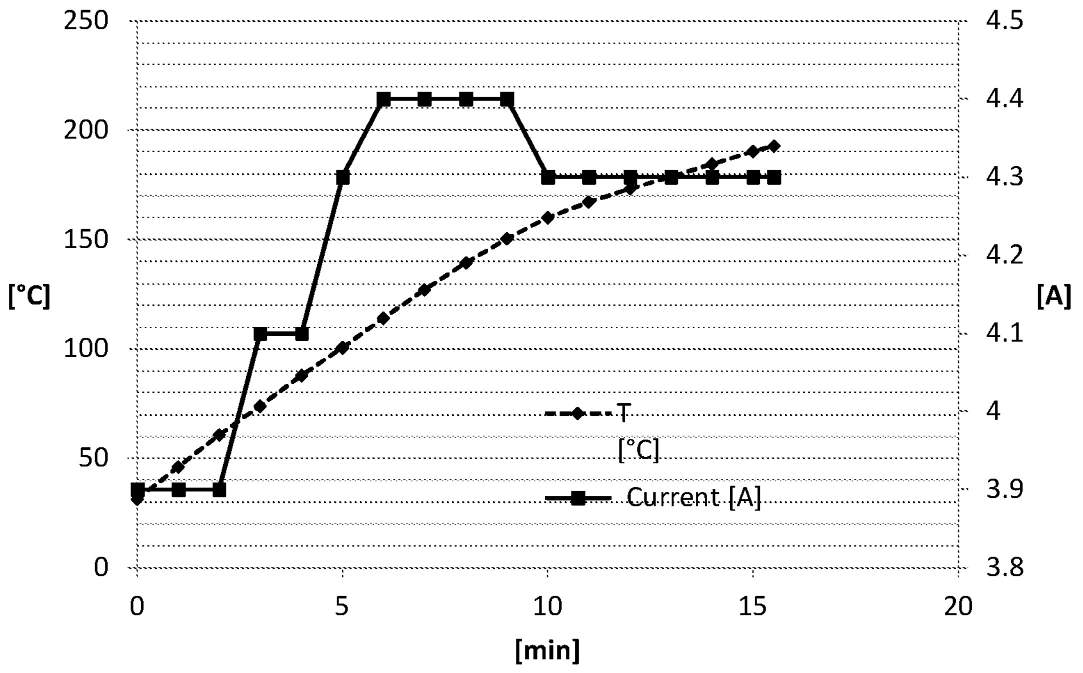
FIG. 10 shows in a temperature-current consumption diagram the change in current consumption in the mixer over time compared to the increase in temperature in experiment V4 of Example 11, during the heating phase.

The change in current consumption in the mixer over time in line with the increase in temperature for the experiment V3 (Tb=192° C.) can be seen in FIG. 10. Up to 114° C., the current consumption increases by approx. 10%. Afterwards it remains essentially constant. There is no change in the current consumption in the range of the Tg or HDT-A value. Therefore, it can be assumed that an even higher treatment temperature than 192° C. and below Tm is possible, namely up to the temperature at which the current consumption increases significantly and does not drop after the increase.

Example 12

A commercially available amorphous polystyrene from EOS GmbH (Krailling, Germany), type Primecast 101, with a $T_g$ of 100° C. was used.

A mixer of the type "Mixaco LAB-CM 6-12 CM/SM" was used. The casing of the mixer was not cooled.

For the treatment temperature at $T_g$−2° C., a holding phase of 10 minutes was carried out. For the treatment temperature $T_g$+16° C., no reasonable holding phase could be carried out, as no reasonable mixing process could be carried out due to extreme agglomeration of the powder in the mixer. The experiment was therefore stopped after 2 minutes of the holding phase.

TABLE 25

| No. | $T_{max}$ [° C.] | $D_1$ [m/s] | $D_2$ [m/s] | $t_1$ [min] | t2 [min] | $t_1 + t_1$ [min] |
|---|---|---|---|---|---|---|
| Comparison | | | | | | 0 |
| V1 | 98.8 | 34.4 | 17.5 | 28 | 10 | 38 |
| V2 | 116.3 | 34.4 | 34.4 | 29 | 3 | 32 |

TABLE 26

| No. | % <10 μm | d10 [μm] | d50 [μm] | d90 [μm] | Pourability [s] |
|---|---|---|---|---|---|
| Comparison | 0.1 | 69.00 | 79.70 | 85.49 | n.d. |
| V1 | 0.1 | 68.90 | 79.82 | 85.65 | 1.633 |

Figure 11:
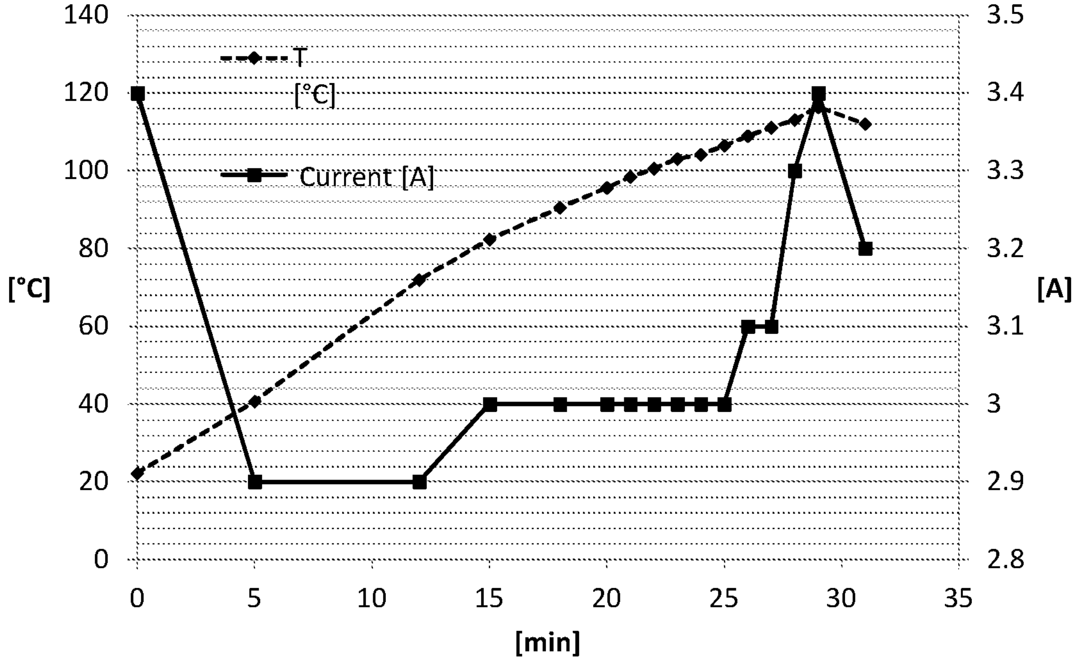
FIG. 11 shows in a temperature-current consumption diagram the change in current consumption in the mixer over time compared to the rise in temperature in experiment V2 of Example 12.

The change in the current consumption in the mixer over time in line with the increase in temperature for the experiment V2 can be seen in FIG. 11 and Table 27. After a drop in current consumption at the beginning of the treatment, it remains constant up to 111° C. ($T_g$+11) and only then it rises significantly, which is due to strong agglomerate formation in the mixer.

TABLE 27

| Time [min] | T [° C.] | Current [A] | dA (f = ax) gradient between last 2 points | gradient/current consumption [%] | Δ T [° C.] |
|---|---|---|---|---|---|
| 0 | 22.1 | 3.4 | | 0.00% | |
| 5.0 | 40.7 | 2.9 | −0.1 | −3.45% | 18.6 |
| 12.0 | 71.9 | 2.9 | 0 | 0.00% | 31.2 |
| 15.0 | 82.2 | 3.0 | 0.033333333 | 1.11% | 10.3 |
| 18.0 | 90.5 | 3.0 | 0 | 0.00% | 8.3 |
| 20.0 | 95.6 | 3.0 | 0 | 0.00% | 5.1 |
| 21.0 | 98.3 | 3.0 | 0 | 0.00% | 2.7 |
| 22.0 | 100.5 | 3.0 | 0 | 0.00% | 2.2 |
| 23.0 | 103.0 | 3.0 | 0 | 0.00% | 2.5 |
| 24.0 | 104.0 | 3.0 | 0 | 0.00% | 1.0 |
| 25.0 | 106.4 | 3.0 | 0 | 0.00% | 2.4 |
| 26.0 | 108.8 | 3.1 | 0.1 | 3.23% | 2.4 |
| 27.0 | 111.0 | 3.1 | 0 | 0.00% | 2.2 |
| 28.0 | 113.0 | 3.3 | 0.2 | 6.06% | 2.0 |
| 29.0 | 116.3 | 3.4 | 0.1 | 2.94% | 3.3 |
| 31.0 | 112.0 | 3.2 | −0.1 | | −4.3 |

As can be seen in particular from Table 27, $T_B$max may be defined for polystyrene as approx. 113° C. in view of the gradient of about 6% compared to the previous current consumption value.

Example 13

A polyamide 12 precipitation powder produced in a conventional manner according to EP863174 with a melting point of 187° C. and a $T_g$ of approx. 50° C. that did not comprise any flow aid, was used. The powder was produced by a precipitation process from an ethanolic solution. The principle for controlling the particle size distribution and the melting point of the starting powder is known from EP863174.

As mixer, a mixer of the type "Mixaco LAB-CM 6-12 CM/SM" was used. The casing of the mixer was not cooled, except in experiment V10.

In V1 to V3, the treatment temperature was varied between 56° C. and 101° C. and the holding phase was left constant for 10 minutes. There occurs an increase of the bulk density with increasing temperature, which is at a maximum at 101.3° C. (about 4%). From a treatment temperature above 75.5° C., a significant reduction of the ultra-fine fraction from 3.6 to 2.7% occurs in V3.

Increasing the rotation speed during the heating phase (V4 vs. V3) from 23.3 to 34.4 m/s reduces the heating time from 21 to 15 minutes. The bulk density remains the same, but the fine fraction is further reduced from 2.7 to 2.1%.

In V5-V7, the rotation speed during the heating phase and the treatment temperature were kept constant at about 100° C. The holding time was varied between 0 minutes and 30 minutes. The bulk density increases minimally until 15 minutes, after that it remains almost constant. With no holding time, the reduction of the fine fraction is the most pronounced (3.6>1.9%), whereas it rises again to 2.2% with a longer holding time. The pourability improves most with 0 minutes holding time to 6 seconds (lowest pouring time=best pourability) and increases again up to 9 seconds with increasing holding time. From a holding time of 30 minutes, the melting enthalpy and thus also the crystallinity of the powder is significantly reduced from 118 to 108 J/g. This indicates that the treatment causes crystalline areas on the surface to melt and recrystallize.

In the experiments V5, V8 and V9, the treatment temperature in the mixer was varied between 95 and 140° C. and the rotation speed in the heating phase was kept constant at 34.4 m/s and the holding time was kept constant at 0 minutes. The bulk density increases by more than 2% at 95° C. and 120° C. and drops back to the level of the reference powder at 140° C. The ultra-fine fraction is reduced with increasing treatment temperature from 2.7 to up to 0.3% for 140° C. treatment temperature.

In V10, the mixer was cooled, in V11 there was no cooling of the mixer. The treatment temperature was kept constant at about 125° C. for 30 minutes holding time. The rotation speed during the heating phase was 34.4 m/s. Due to the cooling of the mixer, the heating phase was significantly extended from 23 to 48 minutes. The bulk density increases slightly more with mixer cooling than without cooling. Similarly, with mixer cooling, the ultra-fine fraction decreases slightly more to 0.5% and the pourability improves slightly more to around 7 seconds.

The change in BET depends on temperature. At a treatment temperature of 120° C., it is reduced from 5.4 to 3.5 $m^2/g$ regardless of the holding time (V9+V11). At a treatment temperature of 140° C., this is reduced even further to approx. 2 $m^2/g$.

The melting enthalpy and thus the crystallinity re decreased significantly at a holding time of 30 minutes from 100° C. (V7, V10, V11). At 120 and 140° C. the reduction is most pronounced from 118 J/g to 105 J/g.

TABLE 28

| No. | $T_{max}$ [° C.] | $D_1$ [m/s] | $D_2$ [m/s] | $t_1$ [min] | t2 [min] | $t_1 + t_1$ [min] |
|---|---|---|---|---|---|---|
| Comparison | | | | | | 0 |
| V1 | 55.8 | 23.3 | 9.3 | 7 | 10 | 17 |
| V2 | 75.5 | 23.3 | 11.7 | 10 | 10 | 20 |
| V3 | 101.2 | 23.3 | 15.2 | 21 | 10 | 31 |
| V4 | 100.2 | 34.4 | 15.2 | 15 | 10 | 25 |
| V5 | 94.9 | 34.4 | 0.0 | 18 | 0 | 18 |
| V6 | 100.6 | 34.4 | 15.2 | 15 | 15 | 30 |
| V7 | 100 | 34.4 | 15.8 | 17 | 30 | 47 |

TABLE 28-continued

| No. | $T_{max}$ [° C.] | $D_1$ [m/s] | $D_2$ [m/s] | $t_1$ [min] | t2 [min] | $t_1 + t_1$ [min] |
|---|---|---|---|---|---|---|
| V8 | 120 | 34.4 | 0.0 | 28 | 0 | 28 |
| V9 | 140.3 | 34.4 | 0.0 | 35 | 0 | 35 |
| V10 | 126.4 | 34.4 | 18.7 | 48 | 30 | 78 |
| V11 | 123.3 | 34.4 | 15.2 | 23 | 30 | 53 |
| V12 | 146 | 34.4 | 16.3 | 26 | 7 | 33 |

TABLE 29

| No. | S [g/cm³] | BET [m²/g] | % <10 µm | d10 [µm] | d50 [µm] | d90 [µm] | Pourability [s] | melting enthalpy [J/g] |
|---|---|---|---|---|---|---|---|---|
| Comparison | 0.429 | 5.38 | 3.6 | 38.75 | 59.13 | 77.56 | not pourable | 119.4 |
| V1 | 0.439 | | 3.6 | 38.73 | 58.77 | 77.40 | 8.830 | 120.1 |
| V2 | 0.441 | | 3.6 | 35.42 | 58.31 | 77.24 | 6.367 | |
| V3 | 0.445 | | 2.7 | 39.89 | 58.91 | 77.66 | 10.317 | 120.8 |
| V4 | 0.445 | | 2.1 | 41.13 | 59.33 | 79.69 | 9.027 | 118.1 |
| V5 | 0.442 | | 1.9 | 41.04 | 58.91 | 78.30 | 6.038 | 118.7 |
| V6 | 0.448 | | 2.2 | 40.95 | 59.22 | 78.27 | 8.715 | 118.4 |
| V7 | 0.450 | | 2.2 | 39.60 | 58.75 | 79.73 | 9.520 | 108.0 |
| V8 | 0.441 | 3.58 | 1.0 | 41.81 | 59.26 | 79.02 | 5.010 | 116.0 |
| V9 | 0.429 | 2.05 | 0.3 | 43.55 | 60.11 | 83.53 | 5.777 | 114.9 |
| V10 | 0.455 | | 0.5 | 42.46 | 61.51 | 129.70 | 7.567 | 106.7 |
| V11 | 0.447 | 3.48 | 0.8 | 41.68 | 59.07 | 78.83 | 8.943 | 105.4 |
| V12 | 0.378 | | 0.2 | 46.36 | 61.12 | 80.92 | 4.987 | 106.7 |

Figure 12:
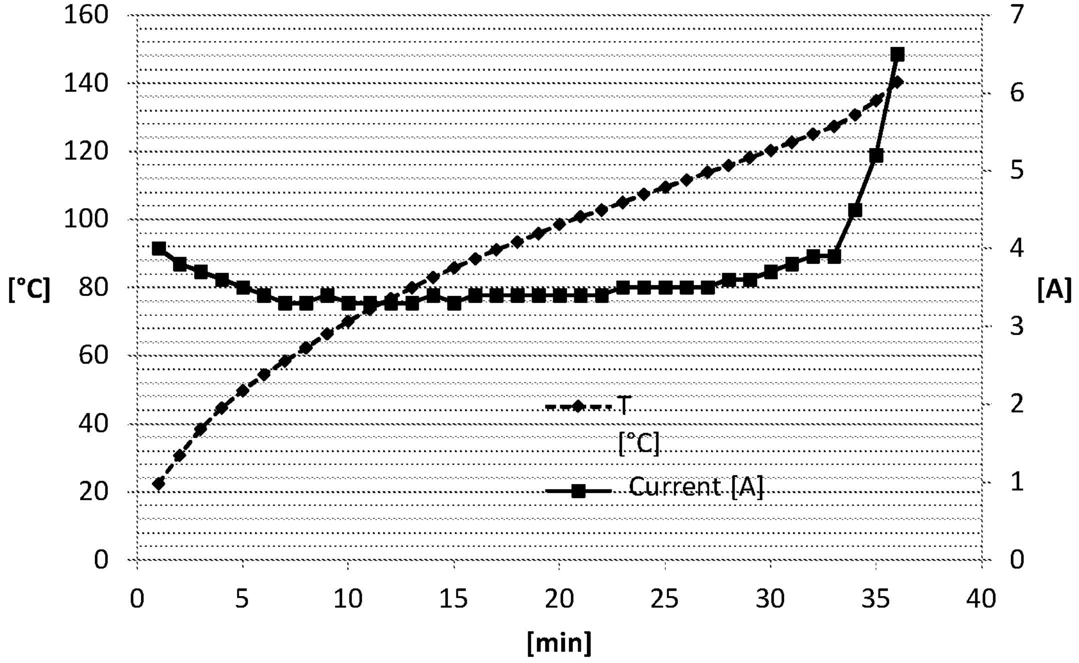
FIG. 12 shows in a temperature-current consumption diagram the change in current consumption in the mixer over time compared to the increase in temperature in experiment V9 of Example 13.

The change in current consumption in the mixer over time in line with the rise in temperature is examined in V9 and can be seen in FIG. 12 and Table 30. At the beginning, the current consumption drops slightly until Tg is reached. Until the HDT-A temperature is reached (see Table 1), the current consumption rises only very slowly from 3.3 to 3.9 A. Above 130.5° C., the current consumption then increases disproportionately strongly from 3.9 A to 4.5 A by approx. 11% until it reaches a value of 6.5 A at 140° C.

If a holding time at 140° C. is subsequently implemented (V12), the temperature continues to rise despite the reduction in rotation speed and after 7 minutes the current consumption is so high that the mixer automatically stops the mixing process by means of a safety shutdown. The bulk density is significantly reduced by approx. 10% compared to the reference material.

Table 30 shows for polyamide 12 (without flow aids) as an example, the change in current consumption in the mixer over time compared to the increase in temperature in experiment V9 of Example 13.

TABLE 30

| Time [min] | T [° C.] | Current [A] | rotation speed [U/min] | dA (f = ax) gradient between last 2 points | gradient/current consumption [%] | Δ T [° C.] |
|---|---|---|---|---|---|---|
| 1 | 22.3 | 4 | 2950 | | 0.00% | |
| 2 | 30.6 | 3.8 | 2950 | −0.2 | −5.26% | 8.3 |
| 3 | 38.3 | 3.7 | 2950 | −0.1 | −2.70% | 7.7 |
| 4 | 44.5 | 3.6 | 2950 | −0.1 | −2.78% | 6.2 |
| 5 | 49.7 | 3.5 | 2950 | −0.1 | −2.86% | 5.2 |
| 6 | 54.2 | 3.4 | 2950 | −0.1 | −2.94% | 4.5 |

TABLE 30-continued

| Time [min] | T [° C.] | Current [A] | rotation speed [U/min] | dA (f = ax) gradient between last 2 points | gradient/current consumption [%] | Δ T [° C.] |
|---|---|---|---|---|---|---|
| 7 | 58.2 | 3.3 | 2950 | −0.1 | −3.03% | 4.0 |
| 8 | 62.2 | 3.3 | 2950 | 0 | 0.00% | 4.0 |
| 9 | 66.2 | 3.4 | 2950 | 0.1 | 2.94% | 4.0 |
| 10 | 70.0 | 3.3 | 2950 | −0.1 | −3.03% | 3.8 |
| 11 | 73.5 | 3.3 | 2950 | 0 | 0.00% | 3.5 |
| 12 | 76.7 | 3.3 | 2950 | 0 | 0.00% | 3.2 |
| 13 | 79.9 | 3.3 | 2950 | 0 | 0.00% | 3.2 |
| 14 | 82.9 | 3.4 | 2950 | 0.1 | 2.94% | 3.0 |
| 15 | 85.6 | 3.3 | 2950 | −0.1 | −3.03% | 2.7 |
| 16 | 88.3 | 3.4 | 2950 | 0.1 | 2.94% | 2.7 |
| 17 | 90.9 | 3.4 | 2950 | 0 | 0.00% | 2.6 |
| 18 | 93.3 | 3.4 | 2950 | 0 | 0.00% | 2.4 |
| 19 | 95.8 | 3.4 | 2950 | 0 | 0.00% | 2.5 |
| 20 | 98.3 | 3.4 | 2950 | 0 | 0.00% | 2.5 |
| 21 | 100.6 | 3.4 | 2950 | 0 | 0.00% | 2.3 |
| 22 | 102.7 | 3.4 | 2950 | 0 | 0.00% | 2.1 |
| 23 | 105.0 | 3.5 | 2950 | 0.1 | 2.86% | 2.3 |
| 24 | 107.2 | 3.5 | 2950 | 0 | 0.00% | 2.2 |
| 25 | 109.4 | 3.5 | 2950 | 0 | 0.00% | 2.2 |
| 26 | 111.5 | 3.5 | 2950 | 0 | 0.00% | 2.1 |
| 27 | 113.7 | 3.5 | 2950 | 0 | 0.00% | 2.2 |
| 28 | 115.7 | 3.6 | 2950 | 0.1 | 2.78% | 2.0 |
| 29 | 117.9 | 3.6 | 2950 | 0 | 0.00% | 2.2 |
| 30 | 120.1 | 3.7 | 2950 | 0.1 | 2.70% | 2.2 |
| 31 | 122.5 | 3.8 | 2950 | 0.1 | 2.63% | 2.4 |
| 32 | 124.9 | 3.9 | 2950 | 0.1 | 2.56% | 2.4 |
| 33 | 127.2 | 3.9 | 2950 | 0 | 0.00% | 2.3 |
| 34 | 130.5 | 4.5 | 2950 | 0.6 | 13.33% | 3.3 |
| 35 | 134.8 | 5.2 | 2950 | 0.7 | 13.46% | 4.3 |
| 36 | 140.3 | 6.5 | 2950 | 1.3 | 20.00% | 5.5 |

The invention claimed is:

1. A method for producing a powder comprising at least one polymer for use in a method for the additive manufacture of a three-dimensional object, comprising:

mechanically treating the powder in a mixer with at least one rotating mixing blade;

conducting at least one heat treatment, wherein the at least one heat treatment includes a $T_B$ heat treatment on the powder that heats the powder to a temperature $T_B$ and wherein the $T_B$ heat treatment is the only heat treatment that heats the powder to a temperature $T_B$;

wherein $T_B$ is at least 30° C. and wherein $T_B$ is below a melting point $T_m$ of the polymer (determined according to DIN EN ISO 11357) if the polymer is a semi-crystalline polymer; or wherein $T_B$ is at least 30° C. and wherein $T_B$ is at most 50° C. above a glass transition temperature $T_g$ of the polymer (determined according to DIN EN ISO 11357) if the polymer is a melt-amorphous polymer; and wherein the $T_B$ heat treatment consists of:

a heating phase defined by raising a heating temperature, starting from an initial temperature below $T_B$, which exists when starting mechanically treating the powder, until the heating temperature reaches the temperature $T_B$; and a holding phase defined by maintaining the heating temperature in a range of $T_B$±10° C. for a holding time; and cooling the powder to a temperature of at most 35° C. after the $T_B$ heat treatment and before the powder is used in an additive manufacturing method, wherein $T_B$ is defined by one or more of the following conditions or methods (i) to (vii):

(i) $T_B$ is above a heat deflection temperature HDT-A of the polymer (determined according to DIN EN ISO 75, measured in a reference measurement on a test specimen consisting only of the polymer, i.e. without any additives);

(ii) $T_B$ is above the heat deflection temperature HDT-A of the polymer (determined according to DIN EN ISO 75, measured in a reference measurement on a test specimen consisting only of the polymer, i.e. without any additives), wherein the polymer is a semi-crystalline polymer;

(iii) $T_B$ is at most 100° C. below the glass transition temperature $T_g$ of the polymer (determined according to DIN EN ISO 11357);

(iv) $T_B$ is at most 100° C. below the glass transition temperature $T_g$ of the polymer (determined according to DIN EN ISO 11357), wherein the polymer is a semi-crystalline polymer;

(v) $T_B$ is at most 100° C. below the glass transition temperature $T_g$ of the polymer (determined according to DIN EN ISO 11357), wherein the polymer is a melt-amorphous polymer;

(vi) for a polymer powder to be used, $T_B$ is at most a temperature $T_{max}$ determined in a temperature-current consumption measurement of the same polymer in a mixer with a mixing blade rotation in the range of 20 to 50 m/s during the heating process, wherein $T_{max}$ is determined in the temperature-current consumption measurement by one or both methods (a) or (b) as follows:

(a) maximum $T_B$ is determined by a temperature-current consumption diagram, wherein one data point is recorded every minute, wherein [(gradient/min)/current consumption] considered only in the range $T_g$−20° C. to $T_m$ is at least greater than 5% and at most 30%; or (b) maximum $T_B$ is determined by a temperature-current consumption diagram, wherein the current consumption of the mixer rises disproportionately strongly within a short time to an increased current consumption value $I_x$, which fulfils at least one condition selected from the group consisting of the conditions:

$I_x$ is at least 10% higher than the average value of at least 10 preceding measuring points, recorded at at least one measurement per minute, wherein only current increases in the range $T_g$−20° C. to $T_m$ are considered, $I_x$ is at most 100% higher than the average value of at least 10 preceding measuring points, recorded at at least one measurement per minute, wherein only current increases in the range $T_g$−20° C. to $T_m$ are considered;

(vii) $T_B$ is at the temperature $T_{max}$±10° C. or below the temperature $T_{max}$ at which a bulk density of the powder drops to a value below a bulk density of untreated powder as a result of use of the mixer, wherein the maximum $T_{max}$ is determined by a test series with different $T_B$ and otherwise the same mixing conditions.

2. The method according to claim 1, wherein a maximum speed of the mixing blade during a heating time before reaching $T_B$ fulfils at least one condition selected from the group consisting of:

the maximum speed of the mixing blade is at least 20 m/s if a volume of the mixer is more than 40 litres; and the maximum speed of the mixing blade during the heating time before reaching $T_B$ is at most 100 m/s if the volume of the mixer is at most 40 litres.

3. The method according to claim 1, wherein, during the heating phase, at least part of the powder, starting from a temperature that is at least room temperature and at most 60° C. above room temperature, reaches the temperature $T_B$ within 20 min.

4. The method according to claim 1, wherein, after reaching the $T_B$ and during the holding phase, the temperature is maintained in a range of $T_B \pm 5$° C. for the holding time.

5. The method according to claim 1, wherein the polymer fulfils at least one condition selected from the group consisting of the conditions:

the polymer is a semi-crystalline polymer and $T_B$ is above the heat deflection temperature HDT-A;

the polymer is a semi-crystalline polymer and $T_B$ is below the heat deflection temperature HDT-B;

the polymer is a semi-crystalline polymer and $T_B$ is at least 20° C. below the melting point $T_m$;

the polymer is a semi-crystalline polymer, copolymer or polymer blend of polyamide and $T_B$ is at least 50° C. below the melting point $T_m$, wherein the polymer is a semi-crystalline polymer and wherein $T_B$ is at a maximum of 250° C.;

the polymer is a semi-crystalline polymer and wherein $T_B$ is at a maximum of 300° C.;

the polymer is a semi-crystalline polymer and $T_B$ is at most 50° C. below the glass transition temperature $T_g$ of the polymer (determined according to DIN EN ISO 11357);

the polymer is a semi-crystalline polymer and $T_B$ is at most 20° C. below the glass transition temperature $T_g$ of the polymer (determined according to DIN EN ISO 11357);

the polymer is a semi-crystalline polymer and $T_B$ is at most 10° C. below the glass transition temperature $T_g$ of the polymer (determined according to DIN EN ISO 11357);

the polymer is a melt-amorphous polymer and $T_B$ is at most 20° C. above the glass transition temperature $T_g$ and at least 10° C. below the glass transition temperature $T_g$, the polymer is a melt-amorphous polymer and $T_B$ is at most 20° C. above the glass transition temperature $T_g$ and at least 20° C. below the glass transition temperature $T_g$, the polymer is a melt-amorphous polymer and $T_B$ is above the heat deflection temperature HDT-A (determined according to DIN EN ISO 75); and the polymer is a melt-amorphous polymer and $T_B$ is between the heat deflection temperature HDT-A (determined according to DIN EN ISO 75) and the heat deflection temperature HDT-B (determined according to DIN EN ISO 75).

6. A method according to claim 1, wherein the at least one heat treatment further includes, after the $T_B$ heat treatment, a $T_N$ heat treatment that exposes the powder to a temperature $T_N$ by heating the powder for a period of at least 30 min and/or at most 30 hours.

7. The method according to claim 6, wherein the $T_N$ heat treatment is associated with one or more of the conditions, each compared to the value of the corresponding parameter before the further step, selected from the group consisting of the conditions:

increase of the bulk density of the powder;

improvement of a pourability of the powder;

reduction of the Brunauer-Emmett-Teller (BET) surface area;

increase of an onset temperature of the melting point $T_m$, increase of a melting enthalpy of the treated powder.

8. The method according to claim 1, wherein the polymer is an amorphous, a pseudo-amorphous, or a semi-crystalline polymer, wherein at least one of the following measures is taken:

(a) use of at least two mixing blades in a mixer whose mixing chamber has a volume of at least 5 L and/or at most 100 L;

(b) use of at least four mixing blades in a mixer whose mixing chamber has a volume of at least 200 L and/or at most 1000 L;

(c) choice of a mixer degree of filling of at least 30% and/or at most 99%;

(d) the temperature $T_B$ is set by adjusting a rotation speed of the mixer and a treatment duration;

(e) the powder, starting from the initial temperature, reaches the temperature $T_B$ within not more than 25 minutes.

9. The method according to claim 1, wherein the powder comprises at least one polymer selected from the group consisting of the following polymers or a polymer blend of at least two polymers selected from the group consisting of the following polymers:

polyetherimides, polycarbonates, polyarylene sulfides, polyphenylene sulfones, polysulfones, polyphenylene oxides, polyether sulfones, acrylonitrile-butadiene-styrene copolymers, acrylonitrile-styrene-acrylate copolymers (ASA), polyvinyl chloride, polyacrylates, polyesters, polyamides, polyaryletherketones, polyethers, polyurethanes, polyimides, polyamide-imides, polysiloxanes, polyolefins, and copolymers which have at least two different repeating units of the above polymers.

10. The method according to claim 1, wherein the powder comprises at least one polymer selected from the group consisting of the following polymers or a polymer blend of at least two polymers selected from the group consisting of the following polymers:

polyaryletherketone, wherein the polyaryletherketone has a melting point $T_m$ (determined according to DIN EN ISO 11357) of at most 330° C., polyaryletherketone, wherein the polyaryletherketone has a melting point $T_m$ (determined according to DIN EN ISO 11357) of at most 320° C., polyaryletherketone, wherein the polyaryletherketone has a melting point $T_m$ (determined according to DIN EN ISO 11357) of at most 310° C., polyaryletherketone, wherein the polyaryletherketone has a glass transition temperature $T_g$ (determined according to DIN EN ISO 11357) of at least 120° C., polyaryletherketone, wherein the polyaryletherketone has a glass transition temperature $T_g$ (determined according to DIN EN ISO 11357) of at least 140° C., polyaryletherketone, wherein the polyaryletherketone has a glass transition temperature $T_g$ (determined according to DIN EN ISO 11357) of at least 160° C.;

polyether ketone ketone, wherein the polyether ketone ketone has a terephthalic acid/isophthalic acid isomer ratio with a terephthalic acid mole fraction of at most 80%, polyether ketone ketone, wherein the polyether ketone ketone has a terephthalic acid/isophthalic acid isomer ratio with a terephthalic acid mole fraction of at most 70%, polyether ketone ketone, wherein the polyether ketone ketone has a terephthalic acid/isophthalic acid isomer ratio with a terephthalic acid mole fraction of at most 65%, polyether ketone ketone, wherein the polyether ketone ketone has a terephthalic acid/isophthalic acid isomer ratio with a terephthalic acid mole fraction of at least 20%, polyether ketone ketone, wherein the polyether ketone ketone has a terephthalic acid/isophthalic acid isomer ratio with a terephthalic acid mole fraction of at least 40%, polyether ketone ketone, wherein the polyether ketone ketone has a terephthalic acid/isophthalic acid isomer ratio with a terephthalic acid mole fraction of at least 55%, polyether ether ketone or its copolymer with diphenyl ether ketone (PEEK-PEDEK);

polyetherimide, wherein the polyetherimide comprises repeating units selected from the group of Formulae I to III polycarbonate, wherein the polycarbonate comprises repeating units according to Formula IV

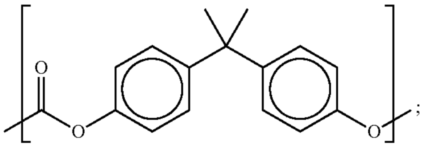

polyarylene sulfide, wherein the polyphenylene sulfide that comprises repeating units according to Formula V

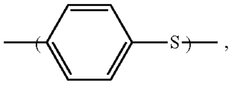

polyaryletherketone-polyetherimide polymer blend, polyaryletherketone-polyetherimide-polycarbonate polymer blend, polyphenylene sulfide-polyetherimide polymer blend, polyetherimide-polycarbonate polymer blend, polyetherimide-polycarbonate polymer blend, wherein the polyaryletherketone of the polymer Formula I

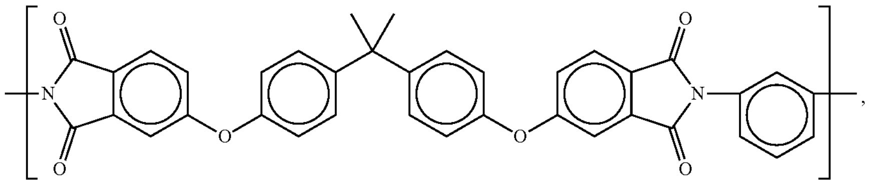

Formula II

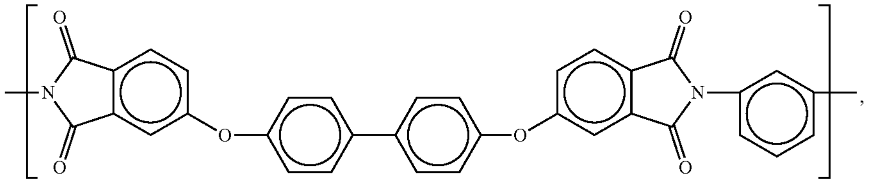

Formula III

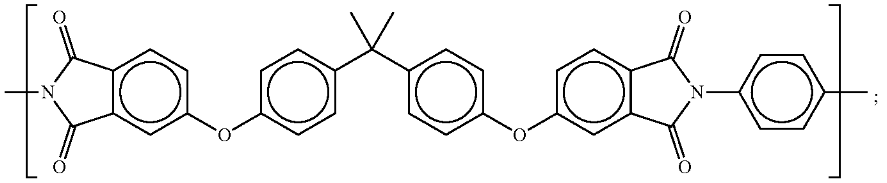

blend is a polyether ketone ketone with a terephthalic acid/isophthalic acid isomer ratio between 65/35 and 55/45, polyetherimide-polycarbonate polymer blend, wherein the polyetherimide of the polymer blend comprises the repeating unit according to formula I defined above, polyetherimide-polycarbonate polymer blend, wherein the polycarbonate of the polymer blend comprises the repeating unit according to Formula IV

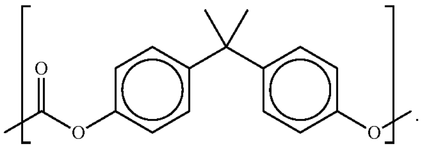

polyphenylene sulfide polymer blend comprising a repeating unit according to

Formula V

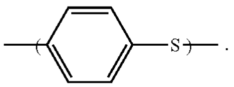

11. The method according to claim 1, wherein a semi-crystalline polymer is used as the polymer and wherein the $T_B$ is below the crystallisation point $T_K$ (determined according to DIN EN ISO 11357 at a cooling rate of 20° C./min), or wherein a pseudo-amorphous polymer is used, wherein the $T_B$ is at most 40° C. above $T_g$ of the polymers, or wherein a melt-amorphous polymer is used, wherein the $T_B$ is at most 20° C. above $T_g$ of the polymer.

12. The method according to claim 1, wherein the powder further comprises at least one additive selected from the group consisting of: heat stabilizers, oxidation stabilizers, UV stabilizers, fillers, dyes, plasticizers, reinforcing fibres, dyes, IR absorbers, $SiO_2$ particles, carbon black particles, carbon fibres, carbon nanotubes, glass fibres, mineral fibres, wollastonite, aramid fibres, Kevlar fibres, glass beads, mineral fillers, inorganic pigments, organic pigments, flame retardants, phosphate-containing flame retardants, ammonium polyphosphate, brominated flame retardants, other halogenated flame retardants, inorganic flame retardants, magnesium hydroxide, aluminium hydroxide, flow aids, polysiloxanes, and fumed silica.

13. The method for the additive manufacture of a three-dimensional object, comprising the steps:

providing the powder as defined in claim 1, and producing the three-dimensional object by selective layer-by-layer solidification of the powder provided at positions corresponding to a cross-section of the object in a respective layer by means of exposure to electromagnetic radiation.

14. The method according to claim 1, wherein, prior to the mechanically treating the powder in the mixer and prior to the exposure of the powder to the temperature $T_B$, the powder is produced by melt spinning including fibre cutting.

15. The method according to claim 12, wherein the powder selected from the powders according to (i) to (viii) has been obtained by melt spinning which includes fibre cutting.

16. A method for producing a powder comprising at least one polymer for use in a method for the additive manufacture of a three-dimensional object, comprising:

mechanically treating the powder in a mixer with at least one rotating mixing blade;

conducting at least one heat treatment, wherein the at least one heat treatment includes a $T_B$ heat treatment on the powder that heats the powder to a temperature $T_B$ and wherein the $T_B$ heat treatment is the only heat treatment that heats the powder to a temperature $T_B$;

wherein $T_B$ is at least 30° C. and wherein $T_B$ is below a melting point $T_m$ of the polymer (determined according to DIN EN ISO 11357) if the polymer is a semi-crystalline polymer; or wherein $T_B$ is at least 30° C. and wherein $T_B$ is at most 50° C. above a glass transition temperature $T_g$ of the polymer (determined according to DIN EN ISO 11357) if the polymer is a melt-amorphous polymer;

wherein the $T_B$ heat treatment consists of a single, continuous heating phase and a holding phase, wherein the single, continuous heating phase is defined by raising a heating temperature, starting from an initial temperature below $T_B$, which exists when starting mechanically treating the powder, until the heating temperature reaches the temperature $T_B$; and wherein the holding phase is defined by maintaining the heating temperature in a range of $T_B$±10° C. for a holding time; and cooling to a temperature of at most 35° C. after the $T_B$ heat treatment and before the powder is used in an additive manufacturing method, wherein $T_B$ is defined by one or more of the following conditions or methods (i) to (vii):

(i) $T_B$ is above a heat deflection temperature HDT-A of the polymer (determined according to DIN EN ISO 75, measured in a reference measurement on a test specimen consisting only of the polymer, i.e. without any additives);

(ii) $T_B$ is above the heat deflection temperature HDT-A of the polymer (determined according to DIN EN ISO 75, measured in a reference measurement on a test specimen consisting only of the polymer, i.e. without any additives), wherein the polymer is a semi-crystalline polymer;

(iii) $T_B$ is at most 100° C. below the glass transition temperature $T_g$ of the polymer (determined according to DIN EN ISO 11357);

(iv) $T_B$ is at most 100° C. below the glass transition temperature $T_g$ of the polymer (determined according to DIN EN ISO 11357), wherein the polymer is a semi-crystalline polymer;

(v) $T_B$ is at most 100° C. below the glass transition temperature $T_g$ of the polymer (determined according to DIN EN ISO 11357), wherein the polymer is a melt-amorphous polymer;

(vi) for a polymer powder to be used, $T_B$ is at most a temperature $T_{max}$ determined in a temperature-current consumption measurement of the same polymer in a mixer with a mixing blade rotation in the range of 20 to 50 m/s during the heating process, wherein $T_{max}$ is determined in the temperature-current consumption measurement by one or both methods (a) or (b) as follows:

(a) maximum $T_B$ is determined by a temperature-current consumption diagram, wherein one data point is recorded every minute, wherein [(gradient/min)/current consumption] considered only in the range $T_g$−20° C. to $T_m$ is at least greater than 5% and at most 30%; or (b) maximum $T_B$ is determined by a temperature-current consumption diagram, wherein the current consumption of the mixer rises disproportionately strongly within a short time to an increased current consumption value $I_x$, which fulfils at least one condition selected from the group consisting of the conditions:

$I_x$ is at least 10% higher than the average value of at least 10 preceding measuring points, recorded at at least one measurement per minute, wherein only current increases in the range $T_g$−20° C. to $T_m$ are considered; and $I_x$ is at most 100% higher than the average value of at least 10 preceding measuring points, recorded at at least one measurement per minute, wherein only current increases in the range $T_g$−20° C. to $T_m$ are considered;

(vii) $T_B$ is at the temperature $T_{max}$±10° C. or below the temperature $T_{max}$ at which a bulk density of the powder drops to a value below a bulk density of untreated powder as a result of use of the mixer, wherein the maximum $T_{max}$ is determined by a test series with different $T_B$ and otherwise the same mixing conditions.

* * * * *